(12) United States Patent
Khazan et al.

(10) Patent No.: US 10,305,870 B2
(45) Date of Patent: May 28, 2019

(54) CRYPTOGRAPHY AND KEY MANAGEMENT DEVICE VERIFICATION

(71) Applicant: Massachusetts Institute of Technology, Cambridge, MA (US)

(72) Inventors: Roger I. Khazan, Arlington, MA (US); Joshua Kramer, Burlington, MA (US); Daniil M. Utin, Waban, MA (US); Mankuan Michael Vai, Sudbury, MA (US); David Whelihan, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 154 days.

(21) Appl. No.: 14/733,325

(22) Filed: Jun. 8, 2015

(65) Prior Publication Data

US 2015/0381659 A1   Dec. 31, 2015

Related U.S. Application Data

(62) Division of application No. 13/937,919, filed on Jul. 9, 2013, now Pat. No. 9,705,854.

(60) Provisional application No. 61/669,179, filed on Jul. 9, 2012, provisional application No. 61/669,171, filed on Jul. 9, 2012.

(51) Int. Cl.
*H04L 29/06* (2006.01)
*H04L 9/08* (2006.01)
*G06F 21/60* (2013.01)
*H04L 9/14* (2006.01)

(52) U.S. Cl.
CPC .......... *H04L 63/061* (2013.01); *G06F 21/602* (2013.01); *H04L 9/0819* (2013.01); *H04L 9/0894* (2013.01); *H04L 9/14* (2013.01); *H04L 63/0428* (2013.01); *H04L 63/126* (2013.01); *H04L 63/20* (2013.01); *H04L 2209/12* (2013.01)

(58) Field of Classification Search
None
See application file for complete search history.

(56) References Cited

U.S. PATENT DOCUMENTS 5,386,471 A   1/1995   Bianco
5,623,637 A   4/1997   Jones et al.
(Continued)

OTHER PUBLICATIONS

Muhlbach et al., "Secure and Authenticated Communication in Chip-Level Microcomputer Bus Systems with Tree Parity Machines," International Conference on IEEE, Jul. 1, 2007, pp. 201-208.
(Continued)

*Primary Examiner* — Henry Tsang
(74) *Attorney, Agent, or Firm* — Occhiuti & Rohlicek LLP

(57) ABSTRACT

A method for operating a secure device having a plurality of mutually exclusive circuit zones, including a first circuit zone having a first level of security and a second circuit zone having a second level of security less than the first level of security, the method including unpacking a key exchange package including receiving a key exchange package in the second circuit zone, the key exchange package including encrypted key data and processing the encrypted key data using a content key in the first circuit zone to generate decrypted key data and storing the decrypted key data in the first circuit zone without disclosing the decrypted key data into the second circuit zone.

14 Claims, 20 Drawing Sheets

(56) References Cited

U.S. PATENT DOCUMENTS

| | | | |
|---|---|---|---|
| 6,823,069 B1* | 11/2004 | Kitajima | H04L 9/0625 380/44 |
| 7,103,782 B1 | 9/2006 | Tugenberg et al. | |
| 8,037,530 B1 | 10/2011 | Fink et al. | |
| 8,412,926 B1 | 4/2013 | Gerraty | |
| 2003/0072454 A1 | 4/2003 | Krawetz | |
| 2006/0005026 A1 | 1/2006 | Song et al. | |
| 2006/0190851 A1* | 8/2006 | Karaki | G06F 17/5059 716/103 |
| 2006/0239458 A1 | 10/2006 | Bicksler et al. | |
| 2008/0072034 A1* | 3/2008 | Lescuyer | H04L 63/0428 713/153 |
| 2008/0181394 A1* | 7/2008 | Keefe | H04L 63/0485 380/28 |
| 2008/0212770 A1 | 9/2008 | Satou et al. | |
| 2009/0228849 A1* | 9/2009 | Mossawir | G06F 17/504 716/106 |
| 2010/0027788 A1 | 2/2010 | Tkacik et al. | |
| 2010/0329463 A1 | 12/2010 | Ratcliff | |

OTHER PUBLICATIONS

Wikipedia "Cross-domain solution," downloaded Aug. 14, 2014 http://en.wikipedia.org/wiki/Cross-domain_solutuion.
Wikipedia "Undirectional network," downloaded Aug. 14, 2014 http://en.wikipedia.org/wiki/Undirectional_network.

* cited by examiner

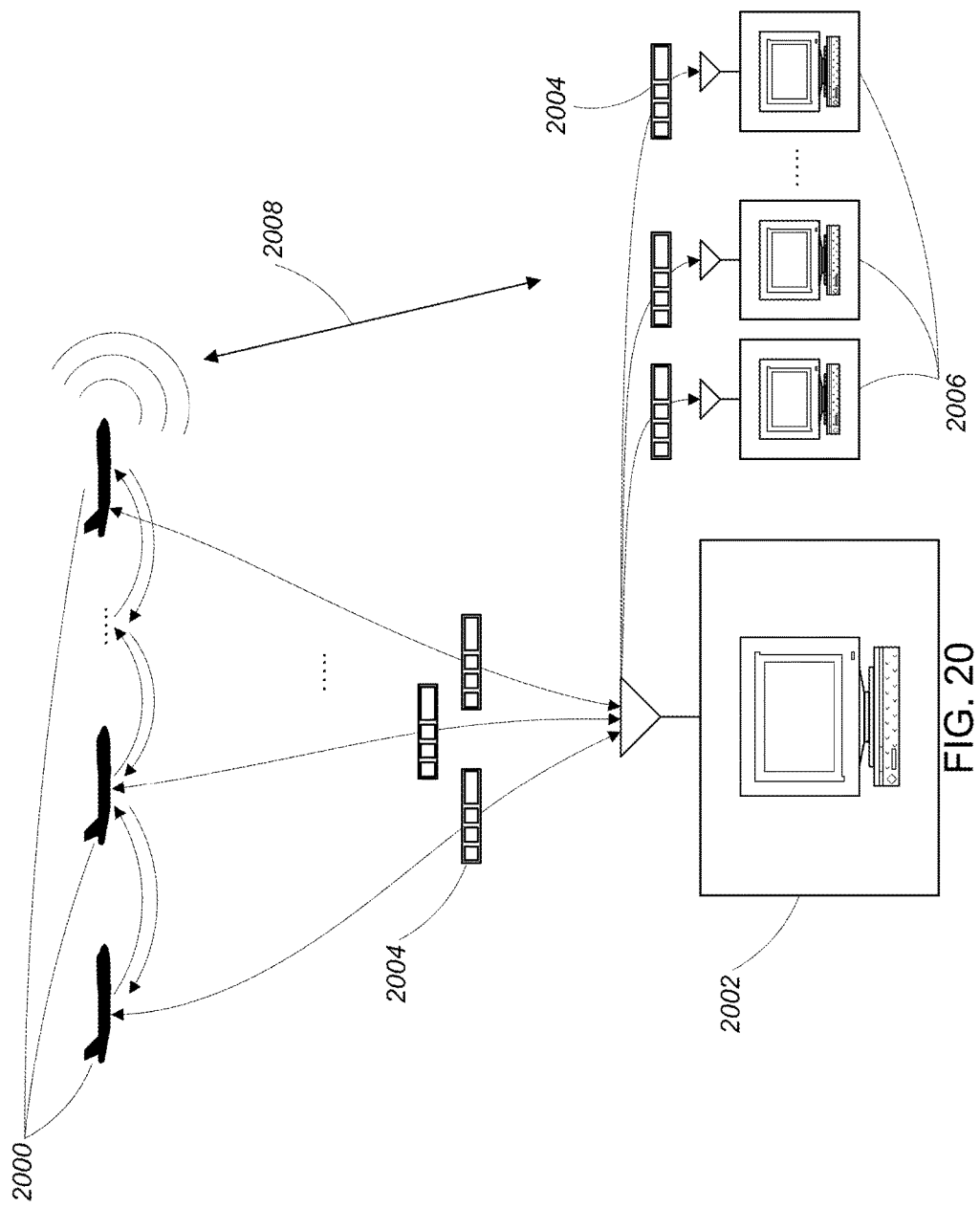

CRYPTOGRAPHY AND KEY MANAGEMENT DEVICE VERIFICATION

CROSS-REFERENCE TO RELATED APPLICATIONS

This application is a divisional of U.S. application Ser. No. 13/937,919 filed Jul. 9, 2013, which claims the benefit of U.S. Provisional Applications No. 61/669,171, titled "SHAMROCK: Self Contained High-Assurance Micro Crypto and Key Management Processor," and 61/669,179, titled "Method for Securing Data using Hardware Functional Gates," both filed Jul. 9, 2012, the contents of which are incorporated herein by reference.

STATEMENT AS TO FEDERALLY SPONSORED RESEARCH

This invention was made with government support under Contract No. FA8721-05-C-0002 awarded by the US Air Force. The government has certain rights in the invention.

BACKGROUND

This invention relates to a device and architecture for secure cryptography and key management.

Modern cryptography offers a variety of schemes for the protection of information at-rest on devices and in-transit among devices. A cryptographic scheme typically "scrambles" or "unscrambles" information using a data-permutation algorithm and a short cryptographic key. The security of the scheme depends on the properties of the algorithm and the quality and secrecy of the key. Thus, cryptographic keys need to be created and managed carefully. In particular, keys need to be protected at-rest and in-transit, which itself calls for the use of various cryptographic schemes.

Hardware implementations of cryptographic functions may exist today in hardware, for example as FPGA cores. There may also be special-purpose solutions that are coupled with applications and may implement some form of specialized key management. For example, HAIPE (High Assurance Internet Protocol Encryptor) devices implement a protocol based on the Internet Protocol Security (IPSec) standard for establishing and securing Internet Protocol (IP) communication among devices.

Although many cryptographic schemes have been standardized and implemented efficiently in software and hardware, these solutions are not universally used or embedded in devices. In general, this is the case due to two main reasons:
  a. The lack of generic, easy-to-deploy, and easy-to-use solutions for key management, and
  b. The challenge of integrating various cryptographic and key management components into a holistically secure design.

While individual cryptographic components exist and may be known to be secure, there is no known "recipe" for integrating different components into secure designs that guarantee security of keys and other information, at-rest and in-transit. It is in such integration that major challenges exist and vulnerabilities are often times introduced.

SUMMARY

In one general aspect, a self-contained, integrated general-purpose design and architecture for a cryptography and key-management solution can be realized as an integrated circuit core, such as, for example, a Field Programmable Gate Array (FPGA) core or an application-specific integrated circuit (ASIC) core.

The key management tasks may include operations such as creating cryptographic keys, associating keys with their purposes, protecting keys at rest in both volatile and non-volatile memory, making keys available for authorized encryptions and authorized decryptions, delivering keys securely to authorized remote devices, archiving keys, evolving keys with time, retiring keys, etc.

Some implementations attain high performance, low power, flexibility, and extensibility—all at the same time. This is achieved by implementing certain, typically computationally demanding components, such as the standard cryptographic functions, directly in hardware (for example using VHDL), while other components, such as key management protocols, in a higher-level language, such as C, in a softcore micro-controller inside the integrated circuit. The softcore micro-controller, allows for different key management protocols and their extensions to be easily created for and deployed in the architecture, even after the integrated circuit core is manufactured and integrated into an application. The hardware implementations of the cryptographic components used by the application and by the key management components facilitate lower-power, higher-speed operations.

Embodiments of the architecture achieve assured security by separating its internals into a number of physical regions (also referred to as "zones" or "circuit zones" in some examples), and tightly controlling which information flows from one region into another and how it does so. The separation among the different regions is enforced by hardware, through the physical layout of the regions and by their interconnections in the integrated circuit.

In some examples, a device has a dedicated region for storing and handling long-term cryptographic keys of the device (such as the ones used for authenticating the device's identity), another region for storing and handling short-term keys (such as the ones used for securing communication sessions), and yet another region for storing and handling information that does not contain exposed secrets (such as encrypted keys). The only physical paths from a region that handles cryptographic keys to the region that interfaces with the application is by going through a "scrambler" circuit (also referred to as a "gate circuit" or "hardware functional gate" in some examples) such as a secure hash function or an AES encryption function. This restricted physical connectivity completely prevents a possibility of keys inadvertently leaking out due to a logical control flow problem in the design.

The hardware-enforced separations among the regions greatly simplifies the task of establishing and verifying security properties of the design and reduce the possibilities of a design bug or an attack compromising these security properties. In contrast, logical separation of regions, which uses logical "guards" to control and restrict the flow of information among the regions, leaves the regions physically connected and, thus, at some level, allow for a possibility that a malfunction or an attack will lead to an undesired flow of information from one region to another, and to a security problem.

Key management operations often involve coordinated processing in different regions, with information flowing among them. In some examples, the key management component allows for such coordinated processing and the necessary flow of information to occur, despite the physical separations among the regions.

The physical separation of the regions that handle keys from those that do not allows for the latter types to use memory that is external to the integrated circuit. Such external memory may be less expensive than and not be as much size-limited as the integrated circuit's internal memory. The device can protect confidentiality and integrity of the information placed in the external memory with encryption.

In some aspects, hardware functional gates include Elliptic Key Diffie-Hellman cryptography gates, true and pseudorandom number generators, signature verification gates, signing gates, Message Authentication Code (e.g., HMAC) gates, and so on.

In some aspects sensors, cameras, and other external hardware devices can be arbitrarily assigned to a security zone.

In some aspects, the general term "cryptographic processing" relates to cryptographic operations such as encryption, decryption, digital signing, digital signature verification, secure hashing, key generation, and so on.

In another aspect, in general, a circuit for secure operation includes a number of mutually exclusive circuit zones including a first circuit zone having a first level of security and a second circuit zone having a second level of security less than the first level of security; and one or more gate circuits each providing limited transfer of data between the circuit zones, the gate circuits providing all data connectivity between the first circuit zone and the second circuit zone and statically configured to prevent unmodified transfer of data from the first circuit zone to the second circuit zone.

Aspects may include one or more of the following.

Each gate circuit may implement a function defined by its circuit to process input data and provide output data via interfaces, each of the interfaces located in a single corresponding circuit zone of the plurality of circuit zones. The function implemented by at least some of the gate circuits may include a cryptographic procedure utilizing a cryptographic key. Each of the one or more gate circuits may follow a design that enforces a security policy with the interfaces located in the corresponding circuit zones to prevent unmodified transfers of data between at least some of said circuit zones. The one or more gate circuits may include one or more of an encryption gate circuit, a controlled transfer gate circuit, a decryption gate circuit, a signing gate circuit, a secure hash function gate circuit, and a public key generation gate circuit. Each circuit zone of at least some of the circuit zones may include a memory local to that circuit zone, wherein at least some of the gate circuits include an interface for accessing memory locations in said memory.

The gate circuits may include an encryption gate circuit configured to accept a key via a first interface in the first circuit zone, to accept unencrypted data via a second interface, and to provide encrypted data via third interface in the second circuit zone. The gate circuits may include a decryption gate circuit configured to accept a key via a first interface in the first circuit zone, to accept encrypted data via a second interface in the second circuit zone, and to provide decrypted data via a third interface in the second circuit zone. The first circuit zone may include a key generation circuit for generation of a key value without disclosure of said key value to the second circuit zone. The device may be configured to use a key value provided to a gate circuit to encrypt data in at least one of the first circuit zone and the second circuit zone to provide corresponding encrypted data to the second circuit zone without disclosure of the key value into the second circuit zone.

The device may be configured to use a key value provided to a gate circuit to decrypt data in the second circuit zone to provide corresponding decrypted data to the first circuit zone without disclosure of the key value into the second circuit zone. The circuit may include a key initialization circuit comprising at least one of a non-volatile storage in the first circuit zone, a Physical Unclonable Function (PUF) in the first circuit zone, and port for passing a value from outside the device to the first circuit zone. The device may include a programmable processor located outside the first security zone, wherein the circuit is configured to validate software for controlling the processor according to key values stored in the first circuit zone. The device may include a Field Programmable Gate Array (FPGA) configured according to configuration data to implement circuit zones and gate circuits. The device may include an Application Specific Integrated Circuit (ASIC).

In another aspect, in general, data stored on a non-transitory computer readable medium includes configuration instructions for configuring a circuit having a plurality of mutually exclusive circuit zones including a first circuit zone having a first level of security and a second circuit zone having a second level of security less than the first level of security and one or more gate circuits each providing limited transfer of data between the circuit zones, the gate circuits providing all data connectivity between the first circuit zone and the second circuit zone and statically configured to prevent unmodified transfer of data from the first circuit zone to the second circuit zone.

Aspects may include one or more of the following features.

The configuration instructions may include hardware description language (HDL) instructions. The configuration instructions may include instructions for configuring a Field Programmable Gate Array (FPGA).

In another aspect, in general, a method for operating a device having a first circuit zone having a first level of security and a second circuit zone, mutually exclusive from the first circuit zone and having a second level of security less than the first circuit zone includes maintaining data in the first circuit zone, providing first data in the first circuit zone to an interface in the first circuit zone to a first gate circuit, the first gate circuit coupling the first circuit zone and the second circuit zone, processing the first data in a first gate circuit to produce second data, providing the second data from the first gate circuit through a second interface in the second circuit zone, wherein the first gate circuit is configured by its circuit design to process the first data to produce the second data such that disclosure of the second data does not disclose of the first data.

Aspects may include one or more of the following features.

Processing the first data in the first gate circuit to produce second data may include forming the second data according to a cryptographic procedure according to a key value in the first data. The cryptographic procedure may include at least one of an encryption procedure, a signing procedure, and a public key generation procedure. Processing the first data in the first gate circuit to produce second data may include forming the second data as a secure hash of the first data.

The method may further include maintaining third data in the second circuit zone, providing the third data in the second circuit zone to a third interface in the second circuit zone to a second gate circuit, the second gate circuit coupling the first circuit zone and the second circuit zone, processing the third data in a second gate circuit to produce fourth data, providing the fourth data from the second gate circuit through a fourth interface in the first circuit zone, wherein the second gate circuit is configured by its circuit design to process the third data to produce the fourth data such that disclosure of the fourth data does not disclose the third data.

Processing the third data in the second gate circuit to produce fourth data may include forming the fourth data according to a decryption procedure according to a key value in the first circuit zone.

In another aspect, in general, a method for operating a secure device having a plurality of mutually exclusive circuit zones, including a first circuit zone having a first level of security and a second circuit zone having a second level of security less than the first level of security, the method includes unpacking a key exchange package, the unpacking including receiving a key exchange package in the second circuit zone, the key exchange package including encrypted key data and processing the encrypted key data using a content key in the first circuit zone to generate decrypted key data and storing the decrypted key data in the first circuit zone without disclosing the decrypted key data into the second circuit zone.

Aspects may include one or more of the following features.

The key exchange package may include header data and the method further comprises processing the header data to generate the content key and storing the content key in the first circuit zone without disclosing the content key into the second circuit zone. The key exchange package may include encrypted key associated data and the method may further include processing a data item in the first circuit zone with a non-invertible function to generate a modified data item and storing the modified data item in the second circuit zone, and processing the encrypted key associated data using the modified data item to generate decrypted key associated data and storing the decrypted key associated data in the second circuit zone. The data item may include the content key.

The method may further include cryptographically processing data in the second circuit zone using the decrypted key data without disclosing the decrypted key data into the second circuit zone. Cryptographically processing the data may include encrypting the data into the second circuit zone using the decrypted key data. Cryptographically processing the data may include decrypting the data into the second circuit zone using the decrypted key data. The secure device may include a plurality of gate circuits providing limited transfer of data between the circuit zones, the gate circuits providing all data connectivity between the first circuit zone and the second circuit zone and preventing unmodified transfer of data from the first circuit zone to the second circuit zone. Processing the encrypted key data using the content key to generate decrypted key data may include using a decryption gate circuit to decrypt the encrypted key data using the content key.

Processing the data item to generate a modified data item may include using a secure hash gate circuit to compute a secure hash of the data item. Processing the encrypted key associated data using the modified data item may include using a decryption circuit to decrypt the encrypted key associated data using the modified data item. At least some of the plurality gate circuits providing connectivity between the first circuit zone and the second circuit zone may store data in the first circuit zone. The method may further include performing a cryptographic exchange with another secure device including using a decryption gate circuit to decrypt data received from the other device in the second circuit zone using the decrypted key data without disclosure of the decrypted key data into the second circuit zone.

The method may further include performing a cryptographic exchange with another secure device including using an encryption gate circuit to encrypt data in the second circuit zone using the decrypted key data without disclosure of the decrypted key data into the second circuit zone. The secure device may include a root circuit zone having a third level of security greater than the first level of security and the second level of security, and processing the header data in the second circuit zone to generate the content key in the first circuit zone includes using a key agreement key in the root circuit zone. Decrypted key associated data may include key metadata associated with the decrypted key data.

In another aspect, in general, a method for operating one or more secure devices, each having a plurality of mutually exclusive circuit zones, including a first circuit zone having a first level of security and a second circuit zone having a second level of security less than the first level of security, the method including processing, at a sending device, key data using a content key to generate encrypted key data and storing the encrypted key data in the second circuit zone without disclosing the key data into the second circuit zone, packaging the encrypted key data into a key exchange package, and transmitting the key exchange package to one or more receiving devices.

Aspects may include one or more of the following features.

The method may further include processing, at the sending device, a data item in the first circuit zone using a non-invertible function to generate a modified data item and storing the modified data item in the second circuit zone without disclosing the data item into the second circuit zone processing, at the sending device, key associated data using the modified data item to generate encrypted key associated data and storing the encrypted key associated data in the second circuit zone, and packaging the encrypted key associated data into the key exchange package.

The method may further include processing, at the sending device, private key data in the first circuit zone to generate header data and storing the header data in the second circuit zone, and packaging the header data into the key exchange package.

The one or more secure devices may include a plurality of gate circuits providing limited transfer of data between the circuit zones, the gate circuits providing all data connectivity between the first circuit zone and the second circuit zone and preventing unmodified transfer of data from the first circuit zone to the second circuit zone. Processing key data using a content key to generate the encrypted key data may include using an encryption gate circuit to encrypt the key data using the content key. Processing the data item to generate a modified data item may include using a secure hash gate circuit to compute a secure hash of the data item. Processing the key associated data using the modified data item may include using an encryption circuit to encrypt the key associated data using the modified data item in the second circuit zone. At least some of the plurality gate circuits providing connectivity between the first circuit zone and the second circuit zone may store data in the first circuit zone.

The method may further include receiving the key exchange package in a second circuit zone of a receiving device, the key exchange package including encrypted key data, processing, at the receiving device, the encrypted key data using a content key in the first circuit zone to generate decrypted key data and storing the decrypted key data in the first circuit zone of the receiving device without disclosing the content key into the second circuit zone of the receiving device. The key exchange package may include header data and the method may further include processing, at the receiving device, the header data to generate a content key and storing the content key in the first circuit zone of the receiving device without disclosing the content key into the second circuit zone of the receiving device.

The key exchange package may include encrypted key associated data and the method may further include processing, at the receiving device, a data item with a non-invertible function to generate a modified data item and storing the data item in the second circuit zone of the receiving device without disclosing the data item into the second circuit zone of the receiving device; and processing, at the receiving device, the encrypted key associated data using the modified data item to generate decrypted key associated data and storing the decrypted key associated data in the second circuit zone. The data item may include the content key.

In another aspect, in general, a method for establishing group key data among a plurality of secure devices, each secure device having a plurality of mutually exclusive circuit zones, including a first circuit zone having a first level of security and a second circuit zone having a second level of security less than the first level of security including receiving the key exchange package in a second circuit zone of each of the secure devices, the key exchange package including encrypted key data, establishing a shared key data in the first circuit zone of each of the secure devices including, for each of the secure devices, processing the encrypted key data using a content key to generate decrypted key data and storing the decrypted key data in the first circuit zone of each of the secure device without disclosing the content key into the second circuit zone of the secure device, securely exchanging messages between the secure devices, the messages being processed by the shared key data.

Aspects may include one or more of the following features.

The method may further include distributing the key exchange package from a secure computer server.

In another aspect, in general, a method for computer-implemented verification of security of a device includes accepting data comprising a circuit description of the device, identifying using a computer a plurality of mutually independent circuit zones from the circuit description such that no data paths pass between said circuit zones, identifying a plurality of gate circuits providing data paths between the circuit zones, the gate circuits being verified to limit unmodified transfer of data between zones by their circuitry according to a security policy, and verifying that the security device complies with the security policy according to whether all data paths between the circuit zones are via the identified gate circuits according to the security policy.

Aspects may include one or more of the following features.

The method may further include using a computer to verify that the gate circuits limit unmodified transfer of data between zones by their circuitry according to the security policy. Accepting the circuit description of the device may include accepting a specification of the circuit zones of the device. The method may further include associating a security index with each circuit zone, and wherein verifying that the security device complies with the security policy comprises verifying that the security indices of interfaces between the gate circuits and the circuit zones satisfy the security policy.

Other features and advantages of the invention are apparent from the following description, and from the claims.

DESCRIPTION OF DRAWINGS

FIG. 20 is an unmanned aerial vehicle (UAV) group keying application of a key management and cryptography device.

DESCRIPTION

Figure 1:
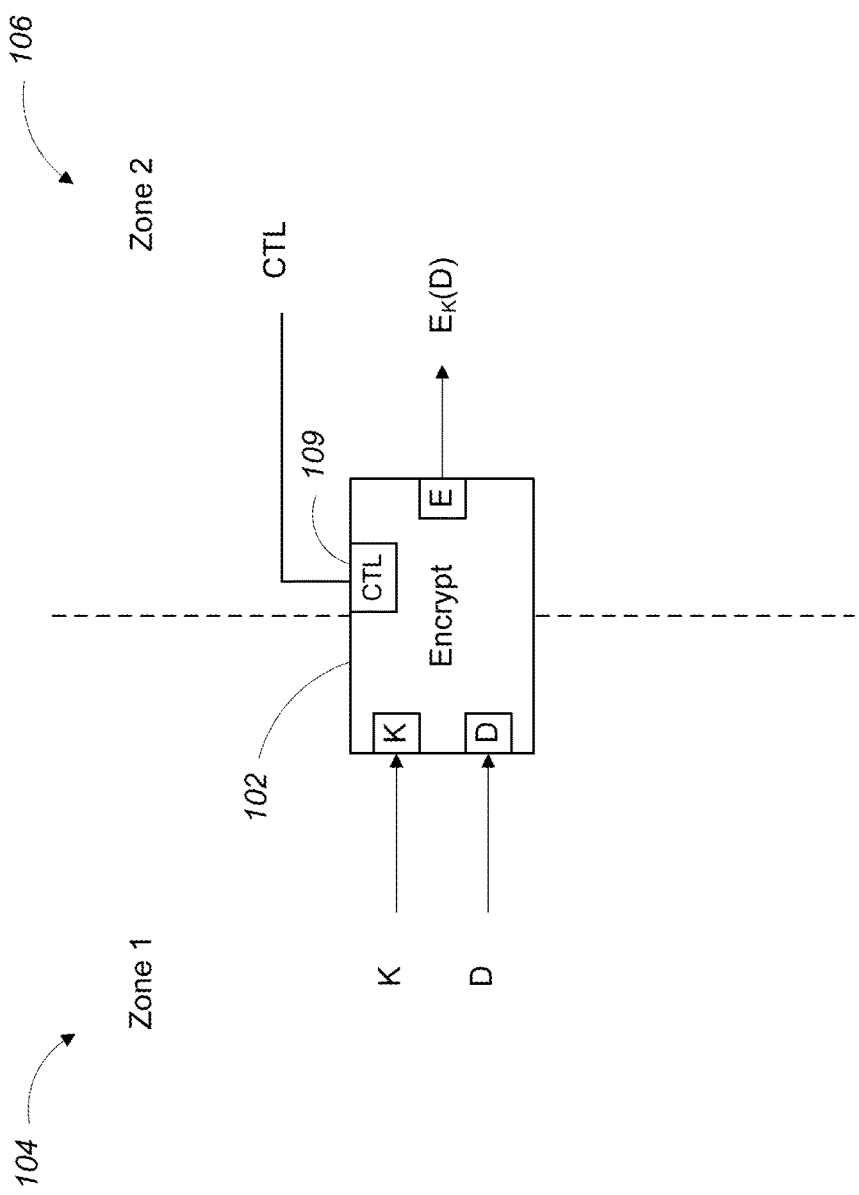
FIG. 1 is a hardware functional gate (HFG).

The description below focuses on a security architecture for an integrated device that incorporates cryptographic and key management functions. In some implementations, the device is a standalone device (e.g., an integrated circuit), which may be integrated with host or peripheral devices, but it should be understood that the elements described below may be further integrated, for example, in a larger monolithic device. Also, devices that are structured according to the architecture may be implemented using a variety of technologies, including but not limited to field-programmable gate arrays (FPGAs) and application-specific integrated circuits (ASICs), and may include a combination of dedicated circuitry for specific functions as well programmable embedded processing cores. Although useful functionality may be achieved using a single device, multiple devices each following the architecture may interact using the integrated cryptographic and key management functions to achieve secure communication between or distributed operation (e.g., identity management) of multiple devices, and devices following the architecture may interact with other secure systems that implement consistent security policies, but that do not necessarily themselves follow the same architecture.

At a very general level, a device following the security architecture includes multiple different security "zones." Each zone is associated with a security level, such that for at least some pairs of zones, one zone may be designated to be less secure than the other. In some examples, the security level for each zone is designated by non-negative integer index, which in this document as a matter of convention has a lower value indicating a greater degree of security (i.e., security index 0 is the most secure level), and therefore the security order of any two zones is determined by the security indices of the zones. It should be understood that in some implementations, the zones are only partially ordered according to their security levels and therefore the relative security level of certain pairs of zones is not defined.

Each security zone has associated circuitry that implements functions and transformations of data within that zone. Although circuitry implementing the functions within a circuit zones may be physically separated in the layout of a particular device, logical separation of the zones is a primary factor that permits verification of the design of a particular device as satisfying a security policy. In some examples, logical separation means that none of the circuitry related to data paths of a given security zone is connected to the circuitry related to data paths of another security zone except rigorously verified gate circuitry. Such logical separation may be verified, for example, using automated tools using a hardware description language (HDL) specification of the circuitry without necessarily making use of a layout of that circuitry on a device. Furthermore, various types of circuitry may be used to implement functions within any particular zone. For example, both dedicated logic circuitry and instruction (e.g., software) based processors may be used within any particular zone, as long as the inter-zone communication follows the security policy as discussed below.

In some implementations, circuitry implementing security zones may have further separations for security or other technical considerations. For example, different security zones may operate in different clock domains with clock signals being generated independently in some zones from other zones. Similarly, different security zones may operate in different power zones, thereby permitting power control within zones to control energy consumption, temperature etc., and potentially to control leakage of information between zones.

As an example of use of security zones, in some examples, information at a zone at security index 0 may include root cryptographic keys, which if exposed could compromise security of numerous systems or communication links. On the other hand, information at a security index 1 may include session cryptographic keys, which if exposed may compromise security of a single communication link, but may not lead to the degree of undesired access that would result from exposure of a root key.

The security architecture is based on a security policy in which exchange and use of data within a particular security level (e.g., in a particular security zone) is relatively unrestricted, but exchange of information between security levels is limited to enforce the security policy. An example of a policy related to exchange of information between security levels is that a data element at one security level may not pass to a lower security (e.g., higher security index) zone unless it is suitably hashed or encrypted with a key restricted to the higher security zone.

1 Hardware Functional Gates

In order to verify that a particular device follows the security policy, only a limited set of functional elements are permitted to have inputs and output that are in multiple different zones, and therefore can be thought of as "bridges" between zones or functionally "gating" communication and transfer of information between zones. These elements are referred to as "Hardware Functional Gates" (HFG) or "gate circuits" below, without intending to limit any characteristic of such elements by this nomenclature. A set of HFG that have been verified to satisfy a desired security policy can then be used to interconnect the otherwise isolated circuits of the security zones. Verification of the HFG can use one or more of a variety of techniques including manual verification, use of formal verification procedures (e.g., proofs of correctness), and simulation or enumeration of operation of the HFG. Verification that the overall circuit satisfies the security policy is done by a static analysis of the circuitry of the device to ensure that the interconnections between zones appropriately (i.e., according to the security policies) use the HFGs, for example, using automated tools that using a hardware description language (HDL) specification of the circuitry without necessarily making use of a layout of that circuitry on a device. The HFG can be considered to be a set of "building blocks" that can be used to implement complex security procedures or protocols, such that the overall implementations can be easily verified to adhere to the security policy by virtue of appropriate use of the HFGs.

Referring to FIG. 1, one example of an HFG is an encryption HFG 102 bridging two security zones (i.e., Zone 1 104 and Zone 2 106). The encryption HFG 102 has two input interfaces and one output interface. One input (K) is for a cryptographic key, and one input (D) is for a data item. In this example, both of the input interfaces are located in the same security zone (i.e., Zone 1). The output (E) is for an encryption of the data item using the key. In this example, the output interface is located in security Zone 2 which has a lower level of security (and a higher security index) than the security zone of the input interfaces (i.e., Zone 1). Furthermore, there is a control interface 109, which may be configured to accept a signal (e.g., "go") that causes the HFG to perform its function and provides a signal (e.g., "done") indicating that the function has been completed.

The HFG has an associated security policy, which dictates allowable security indexes to which the interfaces of the HFG may be coupled. If Z(K) indicates the security index of the zone to which the key (K) input is coupled, and similarly Z(D) and Z(E) indicates the zones of the data input and encryption output, respectively, then a rule for use of the HFG may be that $Z(E) \geq Z(K)$ and $Z(K) \leq Z(D)$. This rule can be paraphrased as the data D must be encrypted with a key (K) at the same or higher security level (same or lower security index), and the encryption of the data E may be provided by the HFG to a zone at the same of lower security level (higher security index) as the zone of the key input.

As introduced above, an overall circuit design is verified to adhere to a security policy if the circuit topology can be divided into separate zones (i.e., circuit subgraphs of possible data flow) with the only linkages for possible data flow between zones being restricted to HFGs whose interface circuits are coupled to particular zones consistent with their security policies.

In general, each security zone has distinct memory for use within the zone and for providing inputs to and storing outputs from the HFG. In some examples, the memories of the zones include an addressable memory block of volatile memory. In some examples in which an HFG is designed to use the memories in the zones it interfaces with, the control interface to the HFG accepts a command that identifies the address(es) of the inputs and outputs. For instance, for the encryption HFG discussed above, rather than the control interface simply accepting a "go" and providing a "done" signal, the control interface may accept an input address for each of the key and data inputs, and an output address for the encrypted output. Note that these addresses are interpreted in the zones associated with the corresponding interfaces. At least conceptually each zone can be considered to have its own address space that is only accessible from circuitry within that zone or from interfaces assigned to that zone. In some cases, the control interface may accept parameters for the function (e.g., in addition to addresses). For example, a length of a data block to be encrypted may be provided to the HFG (e.g., "encrypt a block of n bytes at address addr1 using a key at addr2, and save the result in a block of memory at address addr3"). In some examples, circuitry in a zone may be implemented using a bus-based architecture in which each of the HFG and a memory block in the zone, as well as other intra zone circuitry or processing units, are on a common zone-specific bus, which supports the read and write memory operations in the address space for that zone.

Referring to FIGS. 2-7, an example of a non-exhaustive set of HFGS that can be used to implement a variety of devices includes a first embodiment of an encryption HFG, a controlled transfer HFG, a second embodiment of an encryption HFG, a decryption HFG, a signing HFG, a secure hash HFG, and a public key generation HFG.

1.1 First Encryption HFG

Figure 2:
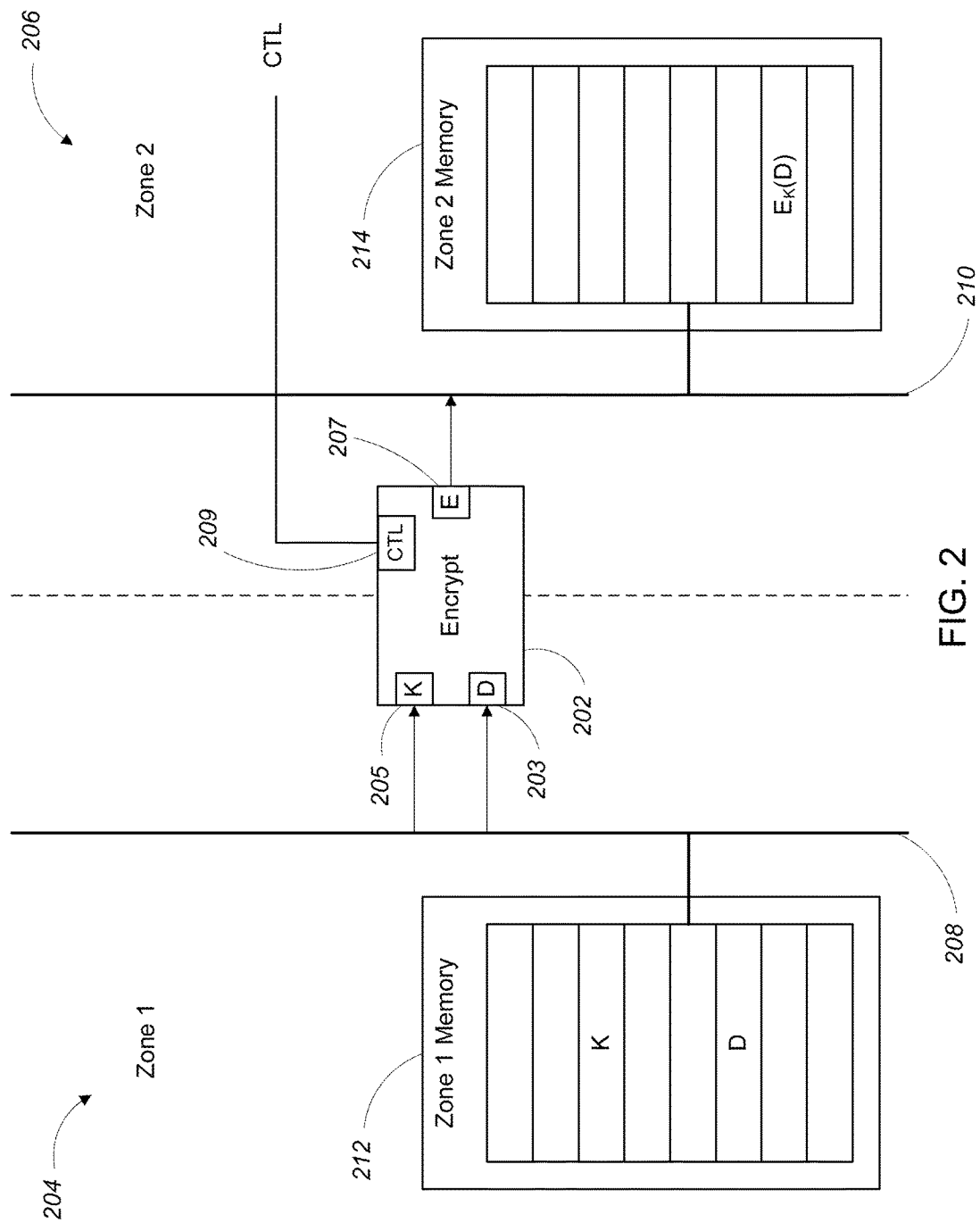
FIG. 2 is first encryption HFG.

Referring to FIG. 2, the first embodiment of the encryption HFG 202 (which is similar to the encryption HFG 102 of FIG. 1) is shown bridging a first security zone (i.e., Zone 1) 204 and a second security zone (i.e., Zone 2) 206. The encryption HFG 202 is configured to encrypt a data item (D) stored in the first security zone 204 using an encryption key (K) stored in the first security zone 204 to produce an encrypted data item $E_K(D)$ which it stores in the second security zone 206. Different instances of such an encryption HFG may implement symmetric encryption (e.g., AES) or asymmetric encryption (e.g., RSA) procedures. The encryption HFG 202 has an associated security policy. The security policy ensures that no secret information (e.g., the encryption key or plaintext D) is inadvertently transferred from the first security zone 204 to the second security zone 206 through the encryption HFG 202. The security policy also ensures that the encryption HFG 202 does not allow data from lower security zones to be arbitrarily placed into higher security zones and later (inadvertently or maliciously) used as a key to exfiltrate other keys or data from the higher security zones into the lower security zones. As is described above, the security policy for any encryption HFG 202 is specified such that the data item D must be encrypted with a key (K) at the same or higher security level (same or lower security index), and the encryption of the data $E_K(D)$ may be provided by the HFG to a zone at the same or lower security level (higher security index) as the zone of the key input. As was noted above, this security policy can be concisely stated as: $Z(E) \geq Z(K)$ and $Z(K) \leq Z(D)$. The first embodiment of the encryption HFG 202 complies with the security policy since encryption of the data E is provided by the HFG to a zone (i.e, Zone 2) with a lower security level (higher security index) than the zone (i.e., Zone 1) of the key input and the data item D is encrypted with an encryption key K at a zone (i.e., Zone 1) having the same security level (the same security index) as the zone (i.e, Zone 1) associated with the data item (i.e., $Z(E) > Z(K)$ and $Z(K)=Z(D)$).

To receive input data, the encryption HFG 202 includes a data item input interface 203 and an encryption key input interface 205 both located in the first security zone 204. To provide output data, the encryption HFG 202 includes an encrypted data item output interface 207 located in the second security zone 206. The data item input interface 203 and the encryption key input interface 205 are connected to a Zone 1 memory 212 via a Zone 1 bus 208. The encrypted data item output interface 207 is connected to a Zone 2 memory 214 via a Zone 2 bus 210.

In some examples, the encryption HFG 202 includes a control interface 209 which receives commands from a controller (not shown). In one exemplary operation of the encryption HFG 202, the control interface 209 receives a command from the controller instructing the encryption HFG 202 to encrypt a data item (D) at a first address, addr1, in the Zone 1 memory 212 using an encryption key (K) at a second address, addr2, in the Zone 1 memory 212 and to store the resulting encrypted data item ($E_K(D)$) at a third address, addr3, in the Zone 2 memory 214.

The command causes the encryption HFG 202 to read the data item from addr1 of the Zone 1 memory 212 and the encryption key from addr2 of the Zone 1 memory 212 via the Zone 1 bus 108. In some examples, the encryption HFG 202 reads the data item and the encryption key from the Zone 1 memory 212 in parallel. In other examples, the data item and the encryption key are sequentially read from the Zone 1 memory 212 and stored (e.g. latched) by the encryption HFG 202. Once the encryption HFG 202 receives the data item and the encryption key at their respective input interfaces 203, 205, the encryption HFG 202 applies an encryption algorithm (e.g., the Advanced Encryption Standard (AES) encryption algorithm) to encrypt the data item using the encryption key. The encryption HFG 202 stores the resulting encrypted data item at addr3 of the Zone 2 memory 214 via the Zone 2 bus 210.

Since the encryption HFG 202 conforms to the security policy described above and includes verified hardware which does not allow leakage of protected information between zones, it is impossible or exceedingly difficult for an attacker to determine the encryption key or other protected information by probing the encryption HFG 202. It is also impossible or exceedingly difficult for an attacker to use the encryption HFG 202 to arbitrarily place data from lower security zones into higher security zones such that the data can later (inadvertently or maliciously) be used as a key to exfiltrate other keys or data from the higher security zones into the lower security zones.

1.2 Controlled Transfer HFG

Figure 3:
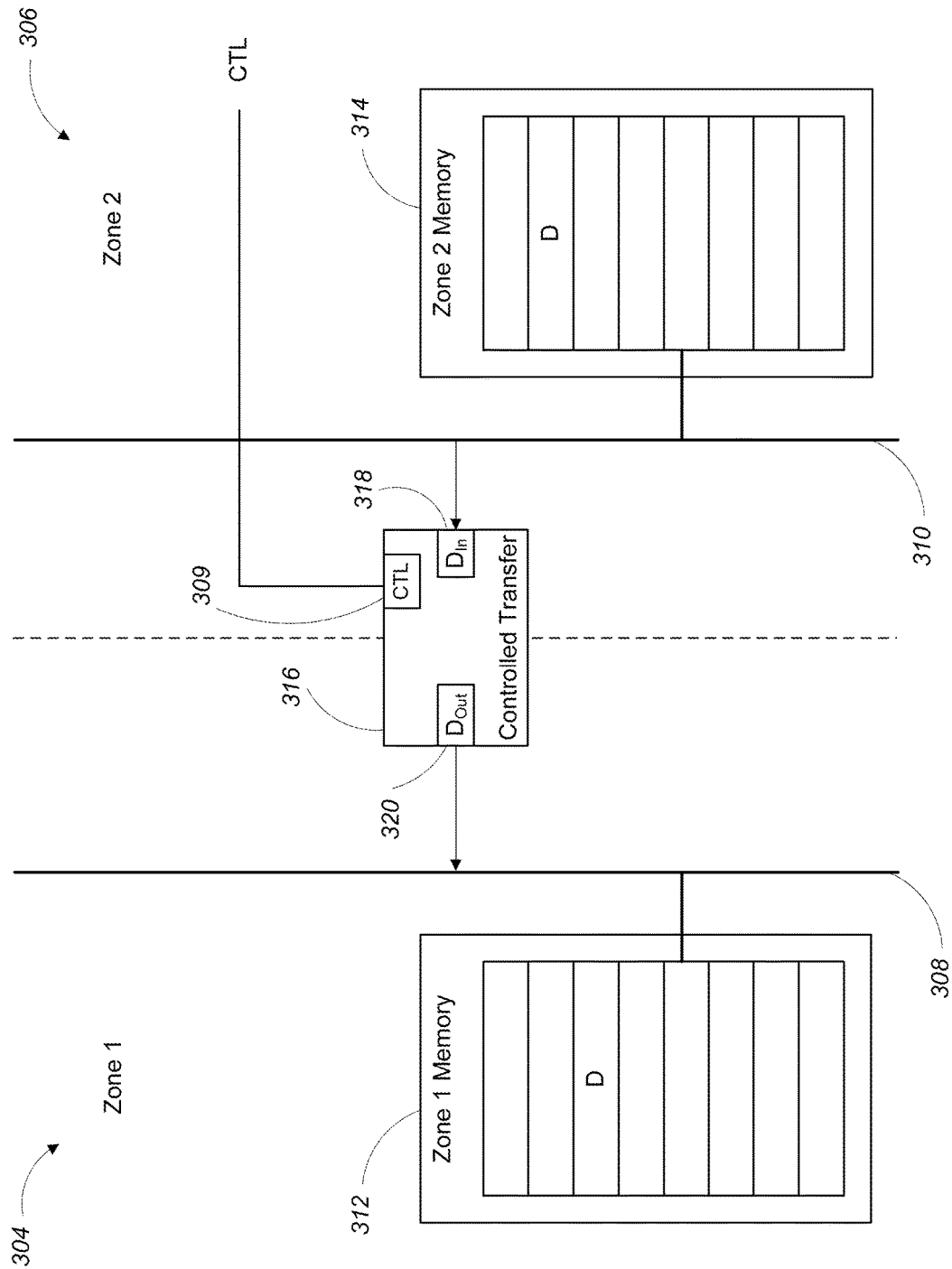
FIG. 3 is a controlled transfer HFG.

Referring to FIG. 3, the controlled transfer HFG 316 (sometimes referred to as a "controlled transfer gate") is shown bridging a first security zone (i.e., Zone 1) 304 and a second security zone (i.e., Zone 2) 306, the first security zone 304 having a higher level of security than the second security zone 306. The controlled transfer HFG 316 is configured to retrieve a data item (D) from the second security zone 306 and to store the data item, unmodified, in the first security zone 304. The controlled transfer HFG 316 has an associated security policy. The security policy ensures that no secret information (e.g., the private key) is inadvertently transferred from the first security zone 804 to the second security zone 806 through the controlled transfer HFG 316. The security policy for the controlled transfer HFG 316 is specified such that the security level of the zone from which the data item is read must be lower than the security level of the zone from which the data item is written out. The security policy for the controlled transfer HFG 316 can be concisely stated as: $Z(D_{Out}) > Z(D_{In})$.

To receive the data item as input, the controlled transfer HFG 316 includes a data item input interface 318 located in the second security zone 306 and connected to a Zone 2 memory 314 via a Zone 2 bus 310. To provide the data item as output, the controlled transfer HFG 316 includes a data item output interface 320 located in the first security zone 304 and connected to a Zone 1 memory 312 via a Zone 1 bus 308.

In some examples, the controlled transfer HFG 316 includes a control interface 309 which receives commands from a controller (not shown). In one exemplary operation of the controlled transfer HFG 316, the control interface 309 receives a command from the controller instructing the controlled transfer HFG 316 to retrieve a data item (D) from a first address, addr1, in the Zone 2 memory 314 and transfer the data item to a second address, addr2, in the Zone 1 memory 312. The command causes the controlled transfer HFG 316 to read the data item from addr1 of the Zone 2 memory 314 via the Zone 2 bus 310. Once the controlled transfer HFG 316 receives the data item, the controlled transfer HFG 316 writes the data item, without modification, to addr2 of the Zone 1 memory 312 via the Zone 1 bus 308.

Since the controlled transfer HFG 316 conforms to the security policy described above and includes verified hardware which does not allow leakage of protected information between zones, it is impossible or exceedingly difficult for an attacker to access information in Zone 1 304 by probing the controlled transfer HFG 316.

In some examples, the controlled transfer HFG 316 includes logic which analyzes the data item (D) to determine whether it meets certain conditions (e.g., length, format, or rate conditions). If it is determined that the data item does not meet the conditions, then the controlled transfer HFG 316 does not transfer the data item into the first security zone.

In other examples, the controlled transfer HFG 316 includes logic which allows only a single data item to be transferred through the HFG. For example, the HFG may maintain a bit representing whether a data item has yet been transferred though the HFG. Before any data item has been transferred through the HFG, the value of the bit is set to 0. When a request to transfer a data item is received at the controlled transfer HFG, the value of the bit is read. If the value of the bit is 0, data transfer is permitted. Upon transferring a data item through the controlled transfer HFG, the value of the bit is set to 1. If the value of the bit is 1, data transfer is not permitted. Thus, after a single data item is transferred through the controlled transfer HFG, any subsequent attempts to transfer data through the controlled transfer HFG are not permitted due to the value of the bit being set to 1. In this way, the controlled transfer HFG logic prevents data from lower security zones from being arbitrarily placed into higher security zones and later (inadvertently or maliciously) be used as a key to exfiltrate other keys or data from the higher security zones into the lower security zones.

In some examples, the controlled transfer HFG is used to place the data item (D) into a designated staging area where other HFGs have access to the data item. In some examples, the designated staging areas include memory which is separate from the memory in which keys are stored.

1.3 Second Encryption HFG

Figure 4:
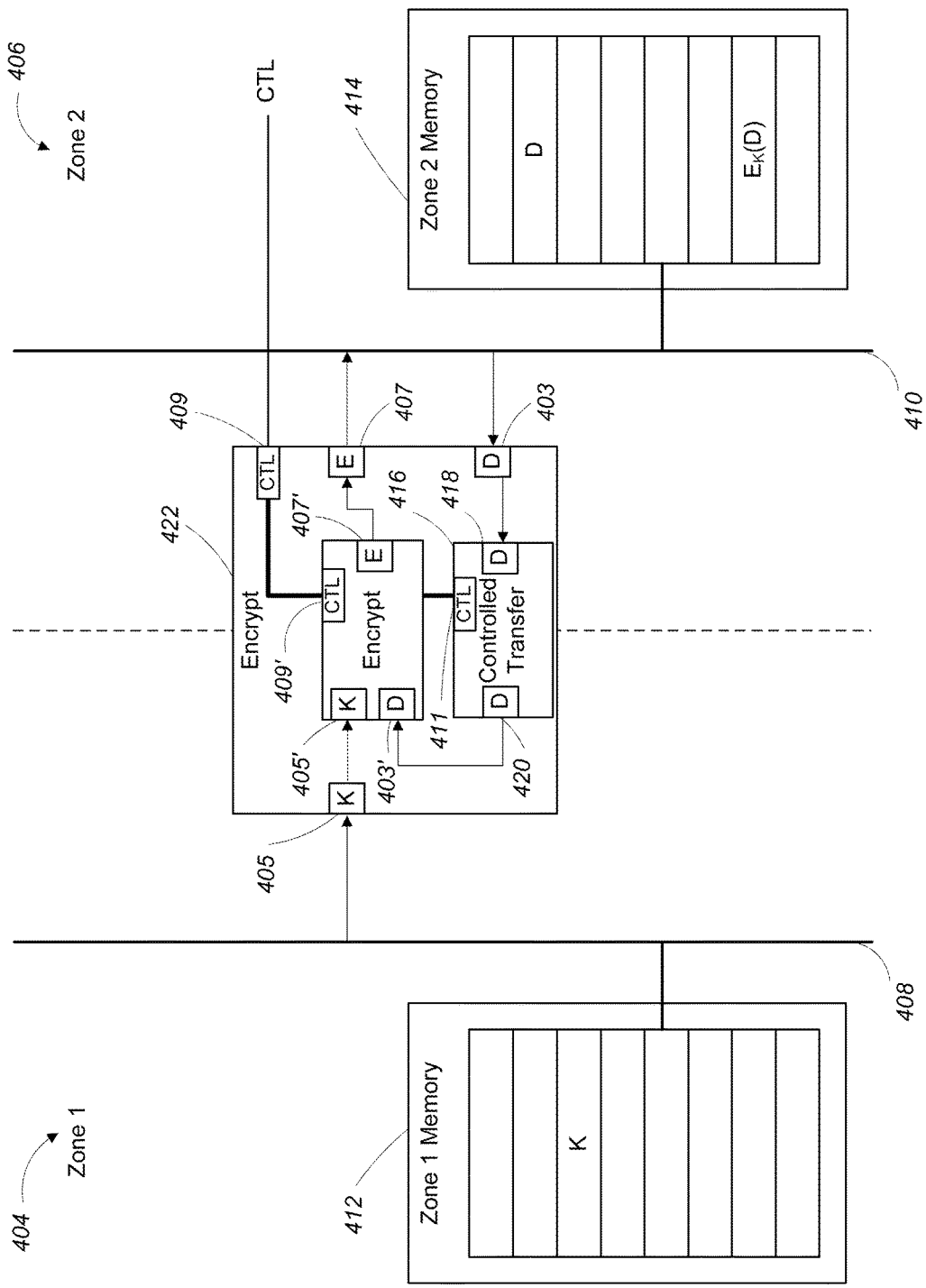
FIG. 4 is a second encryption HFG.

Referring to FIG. 4 a second embodiment of an encryption HFG 422 is shown bridging a first security zone (i.e., Zone 1) 404 and a second security zone (i.e., Zone 2) 406. The encryption HFG 422 is configured to encrypt a data item (D) stored in the second security zone 406 using an encryption key (K) stored in the first security zone 404 to produce an encrypted data item $E_K(D)$ which it stores in the second security zone 406. To ensure that no secret information (e.g., the private key) is inadvertently transferred from the first security zone 404 to the second security zone 406 through the encryption HFG 422, encryption HFG 422 complies with the general encryption HFG security policy described above. In particular, the encryption HFG 422 complies with the general encryption HFG security policy since the encryption of the data item $E_K(D)$ is provided by the encryption HFG 422 to a zone with a lower security level (higher security index) than the zone of the key input and the data item D is encrypted with an encryption key K at a zone having a higher security level (a lower security index) than the zone associated with the data item (i.e., $Z(E)>Z(K)$ and $Z(K)<Z(D)$).

To receive input data, the encryption HFG 422 includes a data item input interface 403 located in the second security zone 406 and an encryption key input interface 405 located in the first security zone 404. To provide output data, the encryption HFG 422 includes an encrypted data item output interface 407 located in the second security zone 406. The data item input interface 403 and the encrypted data item output interface 407 are connected to a Zone 2 memory 414 via a Zone 2 bus 408. The encryption key input interface 405 is connected to a Zone 1 memory 412 via a Zone 1 bus 408.

Internally, an example of the second embodiment of the encryption HFG 422 includes the first embodiment of the encryption HFG 402 of FIG. 2 and the controlled transfer HFG 416 of FIG. 3. The controlled transfer HFG 416 is used to transfer the data item D from Zone 2 406 into Zone 1 404 for encryption using the first embodiment of the encryption HFG 402. Specifically, the data item input interface 403 of the second embodiment of the encryption HFG 422 is connected to the data item input 418 of the controlled transfer HFG 416 in Zone 2. The data item output interface 420 of the controlled transfer HFG 416 is connected to the data item input interface 403' of the first embodiment of the encryption HFG 402. The encryption key input interface 405 of the second embodiment of the encryption HFG 422 is connected to the encryption key input interface 405' of the first embodiment of the encryption HFG 402. The encrypted data item output interface 407' of the first embodiment of the encryption HFG 402 is connected to encrypted data output interface 407 of the second embodiment of the encryption HFG 422. Of course, not all implementations make use of such an internal arrangement, for example, using an optimized circuit that achieves the same functionality and data protection.

In some examples, the second embodiment of the encryption HFG 422 includes a control interface 409 which receives commands from a controller (not shown) and provides the commands to a control interface 409' of the first embodiment of the encryption HFG 402 and to a control interface 411 of the controlled transfer HFG 416. In one exemplary operation of the encryption HFG 422, the control interface 409 receives a command from the controller instructing the encryption HFG 422 to encrypt a data item (D) at a first address, addr1, in the Zone 2 memory 414 using an encryption key (K) at a second address, addr2, in the Zone 1 memory 412 and to store the resulting encrypted data item ($E_K(D)$) at a third address, addr3, in the Zone 2 memory 214.

The command causes the controlled transfer HFG 416 to read the data item (D) from addr1 of the Zone 2 memory 414 via the Zone 2 bus 410. Once the controlled transfer HFG 416 receives the data item, the controlled transfer HFG 416 provides the data item, without modification, to the data item input interface 403' of the first embodiment of the encryption HFG 402. The command also causes the first embodiment of the encryption HFG 402 to read the encryption key (K) from addr2 of the Zone 1 memory 412 via the Zone 1 bus 408. Once the first embodiment of the encryption HFG 402 receives the data item and the encryption key at their respective input interfaces 403', 405' the first embodiment of the encryption HFG 402 applies an encryption algorithm to encrypt the data item using the encryption key. The first embodiment of the encryption HFG 202 stores the resulting encrypted data item $E_K(D)$ at addr3 of the Zone 2 memory via the Zone 2 bus 410.

Since the second embodiment of the encryption HFG 422 and its component parts (i.e., the first embodiment of the encryption HFG 402 and the controlled transfer HFG 416) all conform to the encryption security policy described above and include verified hardware which does not allow leakage of encryption key information between zones, it is impossible or exceedingly difficult for an attacker to determine the encryption key or other protected information by probing the second embodiment of the encryption HFG 422. It is also impossible or exceedingly difficult for an attacker to use the encryption HFG 422 to arbitrarily place data from lower security zones into higher security zones such that the data can later (inadvertently or maliciously) be used as a key to exfiltrate other keys or data from the higher security zones into the lower security zones.

1.4 Decryption HFG

Figure 5:
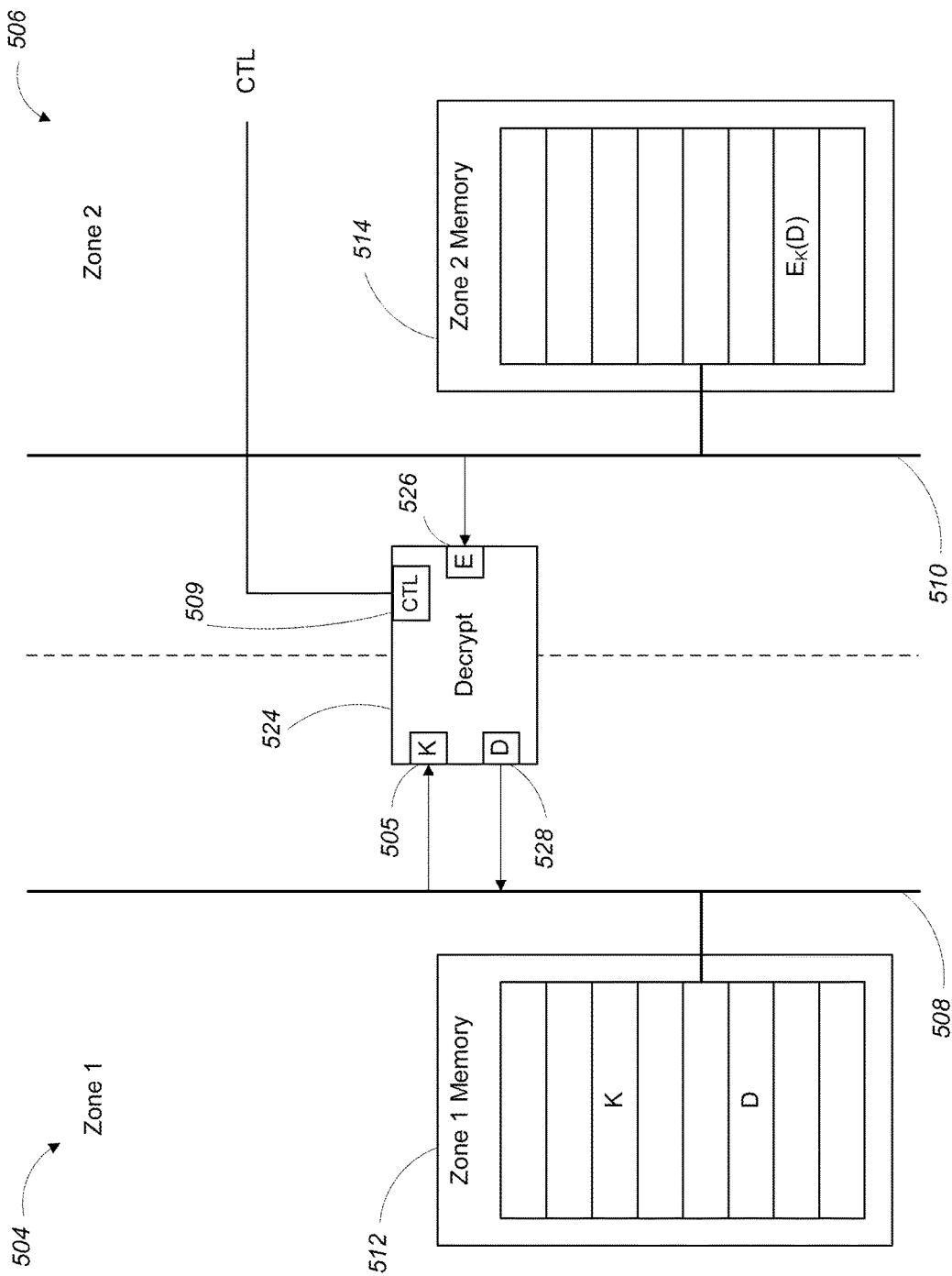
FIG. 5 is a decryption HFG.

Referring to FIG. 5, the decryption HFG 524 is shown bridging a first security zone (i.e., Zone 1) 504 and a second security zone (i.e., Zone 2) 506, the first security zone 504 having a higher level of security than the second security zone 506. The decryption HFG 524 is configured to decrypt an encrypted data item ($E_K(D)$) stored in the second security zone 506 using an encryption key (K) stored in the first security zone 504 to produce an unencrypted data item (D) which it stores in the first security zone 504.

The decryption HFG 524 has an associated security policy. The security policy ensures that no secret information (e.g., the private key) is inadvertently transferred from the first security zone 504 to the second security zone 506 through the decryption HFG 524. The security policy also ensures that the decryption HFG 524 does not allow data from lower security zones to be arbitrarily placed into higher security zones and later (inadvertently or maliciously) used as a key to exfiltrate other keys or data from the higher security zones into the lower security zones. The security policy for the decryption HFT 524 is specified such that an encrypted data item ($E_K(D)$) must be decrypted with an encryption key (K) at the same or higher security level (same or lower security index) and the decrypted data item (D) must be provided to a zone at the same security level (security index) as the zone of the encryption key. This security policy can be concisely stated as: $Z(E) \geq Z(K)$ and $Z(K)=Z(D)$).

To receive input data, the decryption HFG 524 includes an encrypted data item input interface 526 located in the second security zone 506 and connected to a Zone 2 memory 514 via a Zone 2 bus 510 and an encryption key input 505 located in the first security zone 504 and connected to a Zone 1 memory 512 via a Zone 1 bus 508. To provide a decrypted data item output, the decryption HFG 524 includes a data item output interface 528 located in the first security zone 504 and coupled to the Zone 1 memory 514 via the Zone 1 bus 508.

In some examples, the decryption HFG 524 includes a control interface 509 which receives commands from a controller (not shown). In one exemplary operation of the decryption HFG 52, the control interface 509 receives a command from the controller instructing the decryption HFG 524 to decrypt an encrypted data item ($E_K(D)$) at a first address, addr1, in the Zone 2 memory 514 using an encryption key (K) at a second address, addr2, in the Zone 1 memory 512 and to store the resulting decrypted data item (D) at a third address, addr3, in the Zone 1 memory 512.

The command causes the decryption HFG 524 to read the encrypted data item from addr1 of the Zone 2 memory 514 via the Zone 2 bus 510 and to read the encryption key from addr2 in the Zone 1 memory 512 via the Zone 1 bus 508. Once the decryption HFG 524 receives the encrypted data item and the encryption key at their respective input interfaces 526, 505, the decryption HFG 524 applies a decryption algorithm (e.g., the AES decryption algorithm) to decrypt the encrypted data item using the encryption key. The decryption HFG 524 stores the resulting decrypted data item at addr3 of the Zone 1 memory 514 via the Zone 1 bus 508.

Since the decryption HFG 524 conforms to the security policy described above and includes verified hardware which does not allow leakage of the encryption key or other protected information between zones, it is impossible or exceedingly difficult for an attacker to determine the encryption key or other protected information by probing the decryption HFG 524. It is also impossible or exceedingly difficult for an attacker to use the decryption HFG 524 to arbitrarily place data from lower security zones into higher security zones such that the data can later (inadvertently or maliciously) be used as a key to exfiltrate other keys or data from the higher security zones into the lower security zones.

Note that together, an encryption, for example HFG 202 (see FIG. 2), and a decryption HFG 524 (see FIG. 5) provide a means to export a data item D from a secure zone (i.e., zone 1) as an encrypted (e.g., opaque) data item $E_K(D)$, which may be stored in a non-secure location, and then later imported back to the same zone, or any other zone (e.g., a zone 1 at another device), which holds the matching key K used to decrypt the data item.

1.5 Signing HFG

Figure 6:
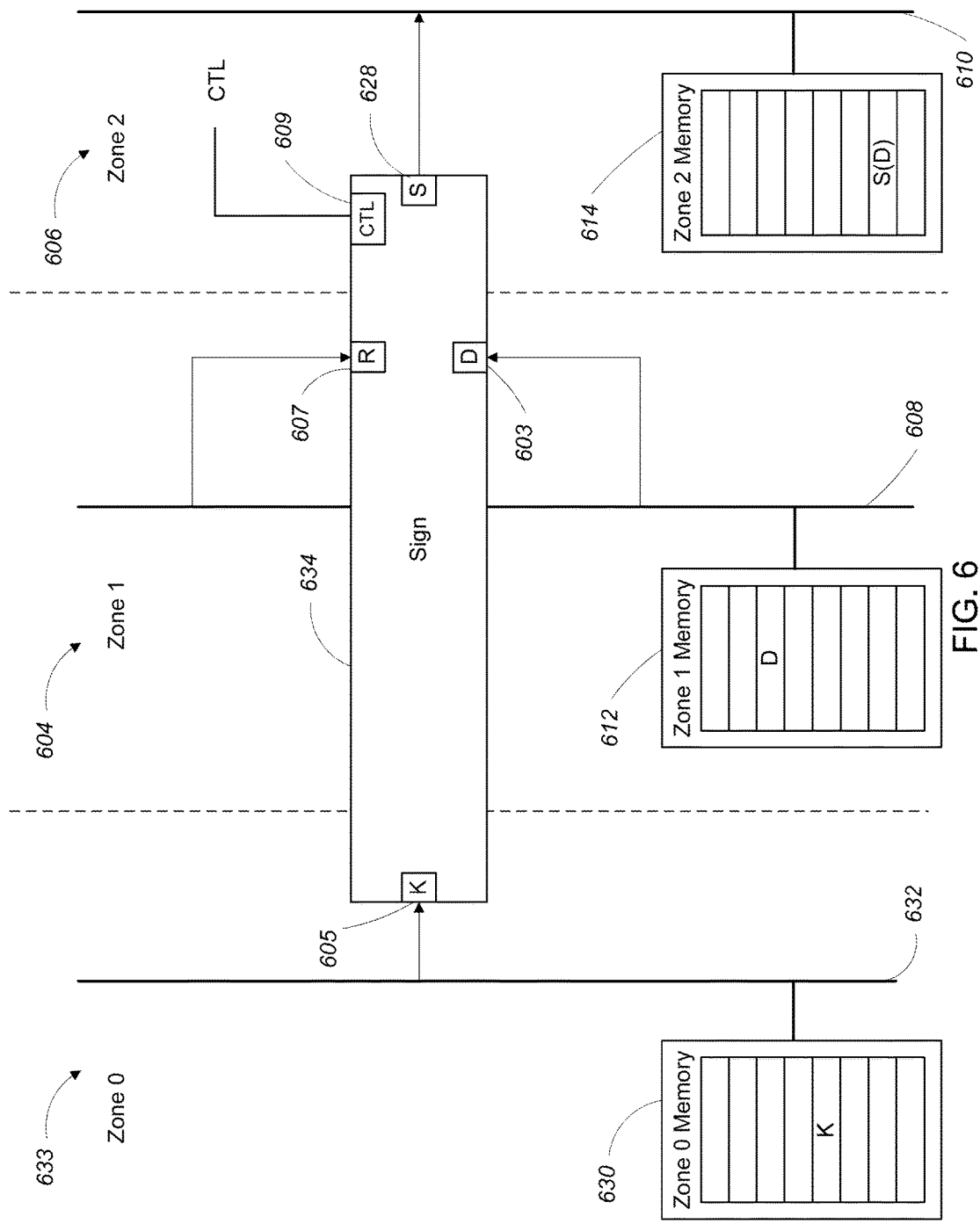
FIG. 6 is a digital signing HFG.

Referring to FIG. 6, the signing HFG 634 is shown bridging three security zones: a first security zone (i.e., Zone 0) 633, a second security zone (i.e., Zone 1) 604, and a third security zone (i.e., Zone 2) 606. The first security zone 633 has a higher level of security than the second security zone 604 which in turn has a higher security level than the third security zone 606.

The signing HFG 634 is configured to digitally sign a data item (D) stored in the second security zone 604 using a cryptographic key (K) stored in the first security zone 633 and a random number (R) to produce a signature of the data item (S(D)) which it stores in the third security zone 606. When a device including the signing HFG 634 sends the signed data item to a receiver, the receiver can verify the signature to ensure that the data is authentic and from the device.

The signing HFG 634 has an associated security policy. The security policy ensures that no secret information (e.g., the private key) is inadvertently transferred from the first security zone 633 to the second security zone 604 or third zone 606 through the signing HFG 634. The security policy also ensures that the signing HFG 634 does not allow data from lower security zones to be arbitrarily placed into higher security zones and later (inadvertently or maliciously) used as a key to exfiltrate other keys or data from the higher security zones into the lower security zones. The security policy for the signing HFG 634 is specified such that a data item (D) must be signed using a key (K) from the same or higher security level and the signature of the data item (S(D)) may be provided to a zone at the same or lesser security level as the zone of the encryption key. This security policy can be concisely stated as: $Z(S) \geq Z(K)$ and $Z(K) \leq Z(D)$ To receive input data, the signing HFG 634 includes a cryptographic key input interface 605 located in the first security zone 633, a random value interface 607 located in the first security zone 633, and a data item input interface 603 located in the second security zone 604. To provide output data, the signing HFG 634 includes a signed data output interface 628 located in the third security zone 606. The cryptographic key input interface 605 is connected to a Zone 0 memory 630 via a Zone 0 bus 632. The data item interface 603 and the random value interface 607 are connected to a Zone 1 memory 612 via a Zone 1 bus 608. The signed data output interface 628 is connected to a Zone 2 memory 614 via a Zone 2 bus 610.

In some examples, the signing HFG 634 includes a control interface 609 which receives commands from a controller (not shown). In one exemplary operation of the signing HFG 634, the control interface 609 receives a command from the controller instructing the signing HFG 634 to sign a data item (D) at a first address, addr1, in the Zone 1 memory 612 using a random value (R) at a fourth address, addr4, in Zone 1 memory and a signing key (K) at a second address, addr2, in the Zone 0 memory 630 and to store the resulting signed data item (S(D)) at a third address, addr3, in the Zone 2 memory 214.

The command causes the signing HFG 634 to read the data item from addr1 of the Zone 1 memory 612 via the Zone 1 bus 608, to read the random value from addr4 of the Zone 1 memory 612 via the Zone 1 bus 608, and to read the signing key from addr2 of the Zone 0 memory 630 via the Zone 0 bus 632. Once the signing HFG 202 receives the data item, the random value, and the cryptographic key at their respective input interfaces 603, 605, the signing HFG 634 applies a digital signing algorithm (e.g., the Elliptic Curve Digital Signing Algorithm (ECDSA)) to sign the data item using the signing key. The signing HFG 634 stores the resulting signed data item S(D) at addr3 of the Zone 2 memory 614 via the Zone 2 bus 610.

Since the signing HFG 634 conforms to the security policy described above (i.e., $Z(S) \geq Z(K)$ and $Z(K) \leq Z(D)$) and includes verified hardware which does not allow leakage of encryption key information between zones, it is impossible or exceedingly difficult for an attacker to determine the cryptographic key or other protected information by probing the signing HFG 634. It is also impossible or exceedingly difficult for an attacker to use the signing HFG 634 to arbitrarily place data from lower security zones into higher security zones such that the data can later (inadvertently or maliciously) be used as a key to exfiltrate other keys or data from the higher security zones into the lower security zones.

Similar to the signing HFG 634, another HFG that is not illustrated performs a signature verification, for example accepting a purported signature S rather than providing it as with the signing HFG, and providing a control signal to the same zone as the signature indicating whether the signature is valid based on the data D and key K at the same or higher security zones.

1.6 Secure Hash HFG

Figure 7:
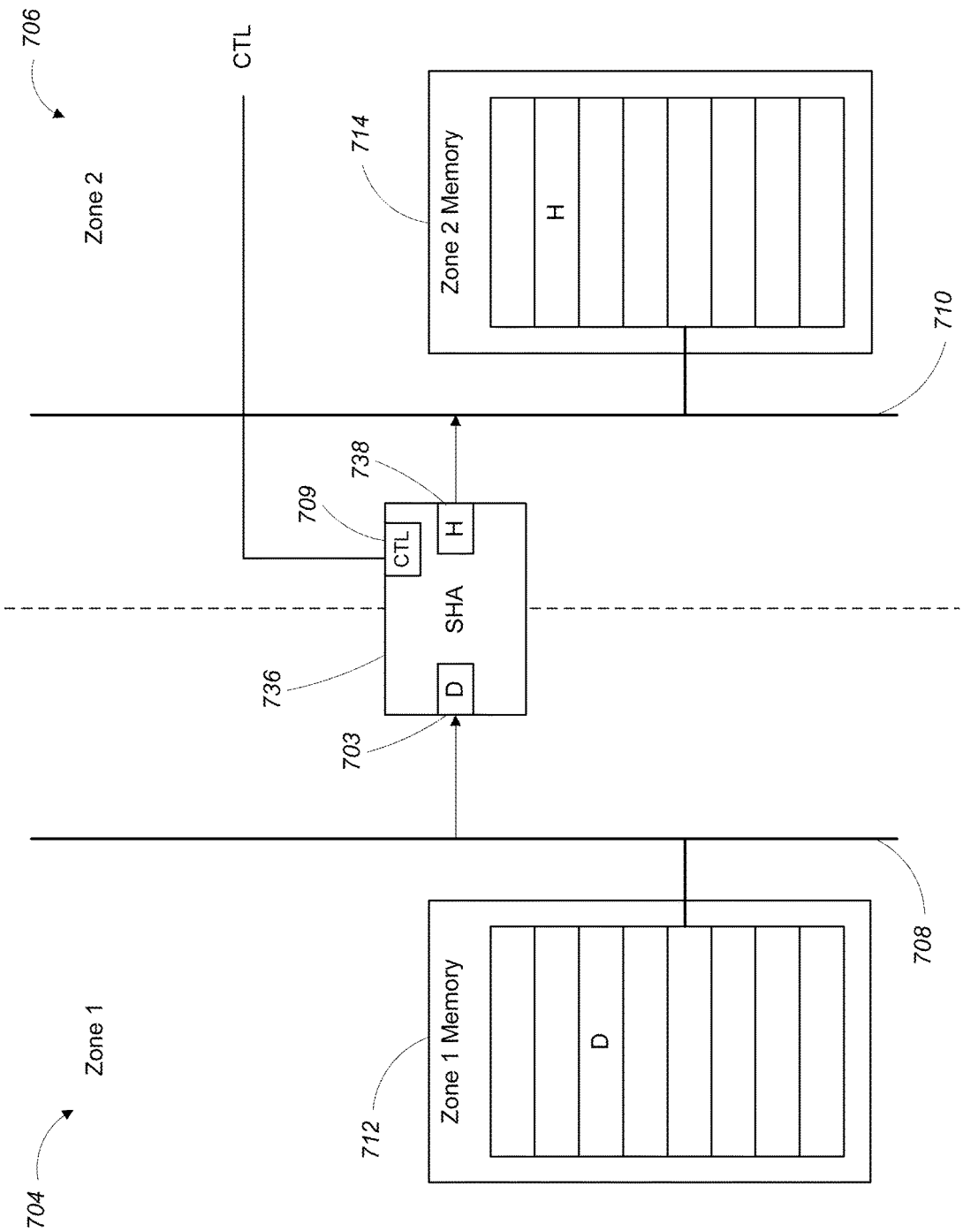
FIG. 7 is a secure hash function HFG.

Referring to FIG. 7, the secure hash (SHA) HFG 736 is shown bridging a first security zone (i.e., Zone 1) 704 and a second security zone (i.e., Zone 2) 706, the first security zone 704 having a higher level of security than the second security zone 706. The secure hash HFG 736 is configured to securely hash a data item (D) stored in the first security zone 704 and store the secure hash of the data item (H) in the second security zone 706.

The secure hash HFG 736 has an associated security policy. The security policy ensures that no protected information is inadvertently transferred from the first security zone 704 to the second security zone 706 through the secure hash HFG 736. The security policy also ensures that the secure hash HFG 736 does not allow data from lower security zones to be arbitrarily placed into higher security zones and later (inadvertently or maliciously) used as a key to exfiltrate other keys or data from the higher security zones into the lower security zones. The security policy is specified such that the secure hash of the data item H may be provided to a security zone with the same or lower security level (higher security index) as the zone of the data item. This security policy can be concisely stated as: $Z(H) \geq Z(D)$.

To receive the data item as input, the secure hash HFG 736 includes a data item input interface 703 located in the first security zone 704 and connected to a Zone 1 memory 712 via a Zone 1 bus 710. To provide the secure hash of the data item as output, the secure hash HFG 736 includes a secure hash output interface 738 located in the second security zone 706 and connected to a Zone 2 memory 714 via a Zone 2 bus 710.

In some examples, the secure hash HFG 736 includes a control interface 709 which receives commands from a controller (not shown). In one exemplary operation of the secure hash HFG 736, the control interface 709 receives a command from the controller instructing the secure hash HFG 736 to perform a secure hash operation on a data item (D) at a first address, addr1, in the Zone 1 memory 712 and to store the resulting securely hashed data item (H) in a second address, addr2, in the Zone 2 memory 714.

The command causes the secure hash HFG 736 to read the data item from addr1 of the Zone 1 memory 712 via the Zone 1 bus 708. Once the secure hash HFG 736 receives the data item at its data item input interface 703, the secure hash HFG 736 applies a secure hash function to the data item, resulting in a secure hash of the data item. The secure hash HFG 736 stores the resulting secure hash of the data item at addr2 of the Zone 2 memory 714 via the Zone 2 bus 710.

Since the secure hash HFG 736 conforms to the security policy described above (i.e., $Z(H) \geq Z(D)$) and includes verified hardware which does not allow leakage of information (e.g., the data item) between zones, it is impossible or exceedingly difficult for an attacker to determine the data item or other protected information by probing the secure hash HFG 736. It is also impossible or exceedingly difficult for an attacker to use the secure hash HFG 736 to arbitrarily place data from lower security zones into higher security zones such that the data can later (inadvertently or maliciously) be used as a key to exfiltrate other keys or data from the higher security zones into the lower security zones.

1.7 Public Key Generation HFG

Figure 8:
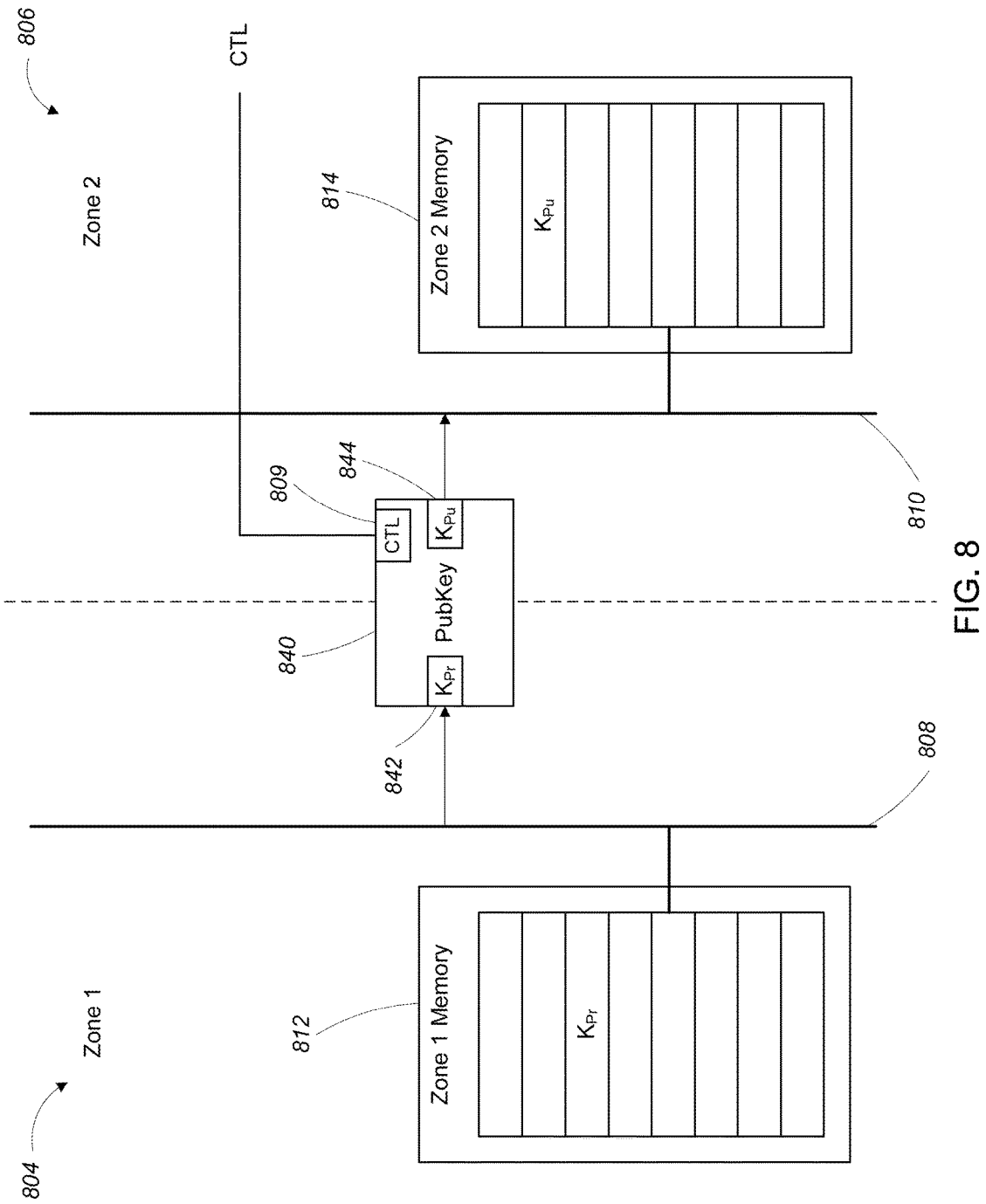
FIG. 8 is a public key generation HFG.

Referring to FIG. 8, the public key generation HFG 840 is shown bridging a first security zone (i.e., Zone 1) 804 and a second security zone (i.e., Zone 2) 806, the first security zone 804 having a higher level of security than the second security zone 806. The public key generation HFG 840 is configured to retrieve a private key ($K_{Pr}$) from the first security zone 804 and to use the private key to generate a corresponding public key ($K_{Pu}$) which it stores in the second security zone 806.

The public key generation HFG 840 has an associated security policy. The security policy ensures that no secret information (e.g., the private key) is inadvertently transferred from the first security zone 804 to the second security zone 806 through the public key generation HFG 840. The security policy also ensures that the public key HFG 840 does not allow data from lower security zones to be arbitrarily placed into higher security zones and later (inadvertently or maliciously) used as a key to exfiltrate other keys or data from the higher security zones into the lower security zones. The security policy for the public key generation HFG 840 is specified such that the public key generated by the public key generation HFG 840 may be provided by the HFG to a zone at the same or lower security level (higher security index) as the private key. The security policy for the public key generation HFG 840 can be concisely stated as: $Z(K_{Pu}) \geq Z(K_{Pr})$.

To receive the private key as input, the public key generation HFG 840 includes a private key input interface 842 located in the first security zone 804 and connected to a Zone 1 memory 812 via a Zone 1 bus 808. To provide the generated public key as output, the public key generation HFG 840 includes a public key output interface 844 located in the second zone 806 and connected to a Zone 2 memory 814 via a Zone 2 bus 810.

In some examples, the public key generation HFG 840 includes a control interface 809 which receives commands from a controller (not shown). In one exemplary operation of the public key generation HFG 840, the control interface 890 receives a command from the controller instructing the public key generation HFG 840 to generate a public key from a private key at a first address, addr1, in the Zone 1 memory 812 and to store the generated public key at a second address, addr2, in the Zone 2 memory 814.

The command causes the public key generation HFG 840 to read the private key ($K_{Pr}$) from addr1 of the Zone 1 memory 812 via the Zone 1 bus 808. Once the public key generation HFG 840 receives the private key at its private key input interface 842, the public key generation HFG 840 uses the private key to generate a public key (e.g., an ephemeral public key). The public key generation HFG 840 stores the resulting public key at addr2 of the Zone 2 memory 814 via the Zone 2 bus 810.

Since the public key generation HFG 840 conforms to the security policy described above (i.e., $Z(K_{Pu}) > Z(K_{Pr})$) and includes verified hardware which does not allow leakage of information (e.g., the private key) between zones, it is impossible or exceedingly difficult for an attacker to determine the private key or other protected information by probing the public key generation HFG 634. It is also impossible or exceedingly difficult for an attacker to use the public key generation HFG 840 to arbitrarily place data from lower security zones into higher security zones such that the data can later (inadvertently or maliciously) be used as a key to exfiltrate other keys or data from the higher security zones into the lower security zones.

While the set of HFGs described above may be sufficient for implementation of some devices, other devices may include additional types of HFGs for securely communicating between security zones.

In the examples described above, HFGs were shown bridging either two or three security zones. However, it is noted that a given HFG can bridge a greater or fewer number of security zones as long as its security policy is observed.

1.8 Other Circuit Elements

The library of HFG defined to implement a security policy is optionally extended to include elements that may be used exclusively within one zone. For example, a secure hash element does not necessarily have to be used to bridge zones, and may be used exclusively within one zone. Also, some elements, such as a true random number generator or a pseudo-random number generator may be included in the library only for use within a single zone.

In the discussion above, and below, HFGs instances may be shown as distinct even if they implement the same function and have the interfaces in the same zones. In such cases, these instances may be implemented in the device as a single shared circuit element, for example, multiplexing and demultiplexing different inputs and outputs for different operations. Note however, that such multiplexing cannot be implemented in a manner that would violated the policy regarding passing data between zones.

1.9 Logical Functional Gates

In some implementations, in addition to the HFG, which enforce the security policy by virtue of the functions that are possible to implement according to the circuitry, additional gate elements may be verified to provide logical security in that data security may be enforced if the element is suitably controlled (e.g., the logic implemented for the controlled transfer HFG described above). Such elements are referred to as "logical functional gates". Note that although using such logical gates between zones may provide a degree of security assuming that the logical control of the elements is not compromised for example by errors in implementation, such logical gates are not used between zones where a strict security policy is to be enforced and verified by the static hardware analysis.

2 Key Management and Cryptography Device

Figure 9:
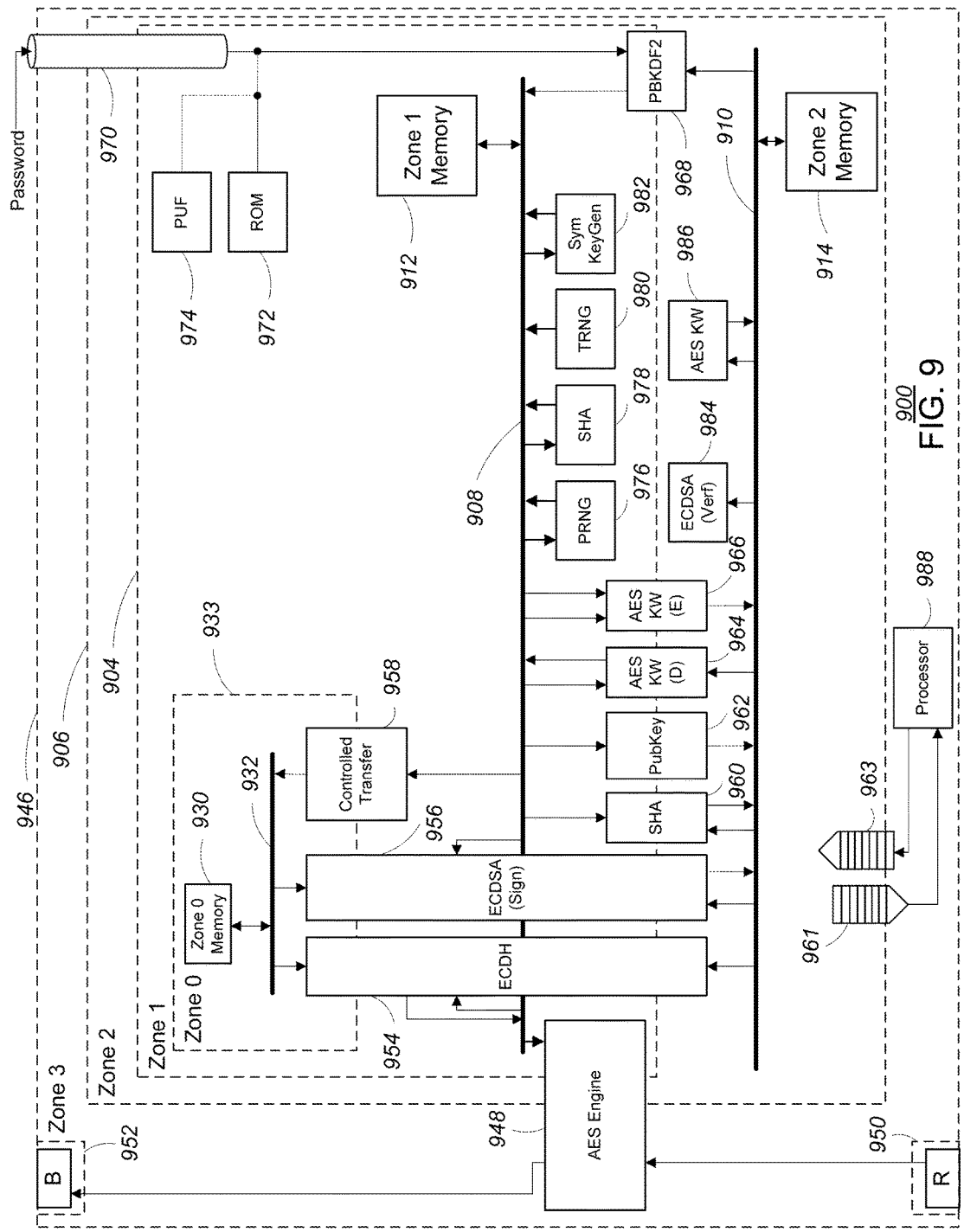
FIG. 9 is a device including a number of HFGs.

Referring to FIG. 9, one example of a key management and cryptography device 900 utilizes the HFGs described above to manage cryptographic keys and perform cryptographic tasks (e.g., create various keys for various purposes, associate meta-data with the keys, use cryptographic functions to protect application data using the keys, and so on). The device can also protect keys (and meta-data) at rest and securely wrap keys (with their meta-data) to other compatible devices. In some examples, such a device is used as part of a larger system which requires key management and cryptography services.

The example device 900 includes four security zones each associated with a security index. In general, a lower the security index denotes a higher the level of security. That is, Zone 0 (i.e., the security zone associated with security index 0) has the highest level of security and Zone 3 (i.e., the security zone associated with security index 3) has the lowest level of security. With the exception an initial "unlocking" procedure (described below), all transfer of data between zones (e.g., from zones with lower security indices to zones with higher security indices) must be performed through HFGs.

In general, Zones 0-3 each includes a memory and a bus. That is, Zone 0 933 includes a Zone 0 memory 930 and a Zone 0 bus 932, Zone 1 904 includes a Zone 1 memory 912 and a Zone 1 bus 908, and Zone 2 includes a Zone 2 memory 914 and a Zone 2 bus 910. HFGs and other hardware modules with interfaces in a given zone can access the zone's memory via the zone's bus. The bus may also communicate control information to and from HFGs and other hardware modules. Such control information may originate, for example, from a microcontroller (e.g., a Tensilica processor in Zone 3) or from a zone specific controller. In general, for the sake of simplicity, control information paths are not illustrated in the figures.

Zone 0 has the highest level of security and is used to store critical data such as root keys and digital signing keys. To maintain the highest level of security, the number of HFGs bridging the boundary of Zone 0 is minimal. Zone 1 is somewhat less secure than Zone 0. Zone 1 has a greater number of HFGs bridging its boundaries, some of which have interfaces in less secure Zones 2 and 3. In general, Zone 1 is used to perform the majority of functions related to provisioning the device, unlocking the device, session key generation, generation and unwrapping of keywrap data, and so forth. Zone 2 generally acts as an interface and staging area between custom code running in Zone 3 and the more secure zones. For example, Zone 2 may store a keywrap in the Zone 2 memory 914 such that Zones 0 and 1 can access the keywrap.

As is noted above, Zone 3 is configurable for executing custom, application specific code (e.g., C language software) which provides data such as keywraps to Zone 2 and sends commands to Zone 2 which ultimately trigger key management and cryptography operations in Zones 0 and 1. In some examples, data is communicated between Zone 2 and Zone 3 via an input FIFO queue 961 and an output FIFO queue 963. Note that in this implementation, Zone 3 and Zone 2 are not at different security levels because data can flow in a logically controlled manner from Zone 2 to Zone 3 via the FIFO queue 961 without "scrambling". However, the logical rather than hardware separation of Zone 2 from Zone 3 does provide a degree of security in that there is not unfettered access to the Zone 2 memory from Zone 3. In some examples, Zone 3 is also configured to receive unencrypted "red" data and apply an encryption algorithm, using an encryption key from Zone 1, to the unencrypted data to generate encrypted "black" output data.

2.1 Device HFGs and Hardware Modules

The device 900 includes a number of HFGs, for example as presented above, and a number of zone specific hardware modules (i.e., hardware modules which do not bridge boundaries between zones). The hardware modules and HFGs are briefly described below and detailed examples of their usage are presented in later sections.

An Elliptic Curve Diffie-Hellman (ECDH) HFG 954 for generating cryptographic keys bridges Zones 0, 1, and 2. In Zone 0, the ECDH HFG 954 is connected to the Zone 0 bus 932 such that it can receive data (e.g., key agreement keys) from the Zone 0 memory 930. In Zone 1, the ECDH HFG 954 is connected to the Zone 1 bus 908 such that it can receive data (e.g., key encryption keys) from and store data (e.g., the resulting symmetric key) in the Zone 1 memory 912. In Zone 2, the ECDG HFG 954 is connected to the Zone 2 bus 910 such that it can receive data (e.g., Public EDCH keys) from the Zone 2 memory 914.

An Elliptic Curve Digital Signature Algorithm (ECDSA) HFG 956 for digitally signing data also bridges Zones 0, 1, and 2. In Zone 0, the ECDSA HFG 956 is connected to the Zone 0 bus 932 such that it can receive data (e.g., a signing key) from the Zone 0 memory 930. In Zone 1, the ECDSA HFG 956 is connected to the Zone 1 bus 908 such that it can receive data (e.g., a random value) from the Zone 1 memory 912. In Zone 2, the ECDSA HFG 956 is connected to the Zone 2 bus 910 such that it can receive data (e.g., a hash of a key update block) from and store signature data (e.g., a signed hash of a key update block) in the Zone 2 memory 914.

A controlled transfer HFG 958 for writing data into the Zone 0 memory 930 bridges Zones 0 and 1. In Zone 0, the controlled transfer HFG 958 is connected to the Zone 0 bus 932 such that it can store data (e.g., root keys, digital signing keys) in the Zone 0 memory 930. In Zone 1, the controlled transfer HFG 958 is connected to the Zone 1 bus 908 such that it can read data (e.g., root keys) from the Zone 1 memory 912. In some examples, the controlled transfer HFG 958 is only functional during unlocking of the device 900 and is disabled during other operating phases of the device 900. Disabling the controlled transfer HFG 958 prevents unwanted or unnecessary writing of data to the Zone 0 memory 930.

An AES engine HFG 948 for encrypting plaintext data 950 to generate encrypted data 952 bridges Zones 1 and 3. In Zone 1, the AES encryptor HFG 948 is connected to the Zone 1 bus 908 such that it can receive an encryption key (e.g., a session key) from the Zone 1 memory 912. In Zone 3, the AES encryptor HFG 948 has an input interface for receiving unencrypted plaintext data (e.g., from a "red" security zone) and an output interface for providing encrypted output data (e.g., to a "black" security zone) 952.

A secure hash function (SHA) HFG 960 for generating a secure hash value from a data item bridges Zones 1 and 2. In Zone 1, the first SHA HFG 960 is connected to the Zone 1 bus 908 such that it can receive a data item (e.g., a content encryption key) from the Zone 1 memory 912. In Zone 2, the SHA HFG 960 is connected to the Zone 2 bus 910 such that it can receive data (e.g., a nonce) from the Zone 2 memory 914 and provide a secure has of the data item (e.g., a secure hash of a content encryption key) to the Zone 2 memory 914.

A public key generation (PubKey) HFG 962 for generating a public key from a private key bridges Zones 1 and 2. In Zone 1, the PubKey HFG 962 is connected to the Zone 1 bus 908 such that it can receive a private key (e.g., an Elliptic Curve Diffie-Hellman private key) from the Zone 1 memory 912. In Zone 2, the PubKey HFG 962 is connected to the Zone 2 bus 910 such that it can provide a public key (e.g., an Elliptic Curve Diffie-Hellman public key corresponding to the private key) to the Zone 2 memory 914.

An AES KeyWrap decryption (AES KW (D)) HFG 964 bridges Zones 1 and 2 and is configured to decrypt an encrypted data item (e.g., an encrypted content encryption key) from the Zone 2 memory 914 using an encryption key from the Zone 1 memory 912 and to store the decrypted data item in the Zone 1 memory 912. In Zone 1, the AES KW (D) HFG 964 is connected to the Zone 1 bus 908 such that it can receive the encryption key from the Zone 1 memory 912 and provide the decrypted data item to the Zone 1 memory 912. In Zone 2, the first AES KW (D) HFG 964 is connected to the Zone 2 bus 910 such that it can receive the encrypted data item from the Zone 2 memory 914.

An AES KeyWrap encryption (AES KW (E)) HFG 966 bridges Zones 1 and 2 and is configured to encrypt a data item (e.g., one or more mission keys) from the Zone 1 memory 912 using an encryption key from the Zone 1 memory 912 and to store the encrypted data item in the Zone 2 memory 914. In Zone 1, the AES KW (E) HFG 966 is connected to the Zone 1 bus 908 such that it can receive the data item and the encryption key from the Zone 1 memory 912. In Zone 2, the AES KW (E) HFG 966 is connected to the Zone 2 bus 910 such that it can provide the encrypted data item to the Zone 2 memory 914.

In some examples, a password port 970 facilitates direct entry of a password into Zone 1 from outside of the device 900. In general, the password port 970 is only operational during the unlocking operational phases of the device 900. In other examples, rather than or in addition to including the password port 970, the device 900 can internally store or generate password-like data using, for example, a read only memory (ROM) 972 or a physical unclonable function (PUF) 974.

A secure password function (PBKDF2) HFG 968 bridges Zones 1 and 2 and is configured to create a cryptographic key (e.g., a key encryption key) using the output of the password port 970 (or the ROM or PUF) and a Salt from the Zone 2 Memory 914 and to store the cryptographic key in the Zone 1 memory 912. In Zone 1, the PBKDF2 HFG 968 is connected to the output of the password port 970 and to the Zone 1 bus 908 such that it can provide the cryptographic key to the Zone 1 memory 912. In Zone 2, the PBKDF2 HFG 968 is connected to the Zone 2 bus 910 such that it can receive the Salt from the Zone 2 memory 914. As is the case with the password port 970, the PBKDF2 HFG 968 is only operational during the provisioning and unlocking phases of the device 900.

A pseudo-random number generator (PRNG) module 976 is included in Zone 1 and is configured to generate a pseudo-random number based on a seed value. The PRNG module 976 is connected to the Zone 1 bus 908 such that it can receive the seed value from the Zone 1 memory 912 and provide the generated pseudo-random number to the Zone 1 memory 912.

A secure hash function (SHA) module 978 is included in Zone 1 and is configured to generate a secure hash value from a data item. The SHA module 978 is connected to the Zone 1 bus 908 such that it can receive the data item from the Zone 1 memory 912 and provide the secure hash of the data item to the Zone 1 memory 912.

A true random number generator (TRNG) module 980 is included in Zone 1 and is configured to generate a true random number based on, for example, thermal noise, clock drift, atmospheric noise, or some other random physical phenomena, for example, using a configuration of oscillators whose frequencies and/or phases depend on the phenomena. The TRNG module 980 is connected to the Zone 1 bus 908 such that it can provide the generated true random number to the Zone 1 memory 912.

A symmetric key generator (Sym KeyGen) module 982 is included in Zone 1 and is configured to receive a pseudo-random number and use the pseudo-random number to generate a symmetric cryptographic key (e.g., a mission key). The Sym KeyGen module 982 is connected to the Zone 1 bus 908 such that it can receive the pseudo-random number from the Zone 1 memory 912 and provide the symmetric cryptographic key to the Zone 1 memory 912.

An Elliptic Curve Digital Signature Verification (ECDSA (Verf)) module 984 is included in Zone 2 and is configured to verify the authenticity of signed data. The ECDSA (Verf) module 984 is connected to the Zone 2 bus 910 such that it can receive signed data. Based on the result of the verification, the ECDSA (Verf) module 984 may output a control signal (not shown) to notify other modules of the device whether they should proceed in processing the signed data.

An AES KeyWrap (AES KW) module 986 is included in Zone 2 and is configured to encrypt data (e.g., mission key metadata) in the Zone 2 memory 914 using an encryption key from the Zone 2 memory 914 and to store the encrypted data in the Zone 2 memory 914. The AES KW module 986 is connected to the Zone 2 bus 910 such that it can receive the data and the encryption key from the Zone 2 memory 914 and provide the encrypted data to the Zone 2 memory 914.

2.2 Device Operation

In general, the HFGs and hardware modules of the device 900 can be utilized in a wide array of ways according to the requirements of a given application of the device. In some examples, a number of procedures can be used to initialize and use the device 900. These procedures may include a secure boot procedure, an unlocking procedure, a provisioning procedure, a keywrap generation procedure, a keywrap unwrap procedure, and a data encryption/decryption procedure.

2.2.1 Secure Boot Procedure

Figure 10:
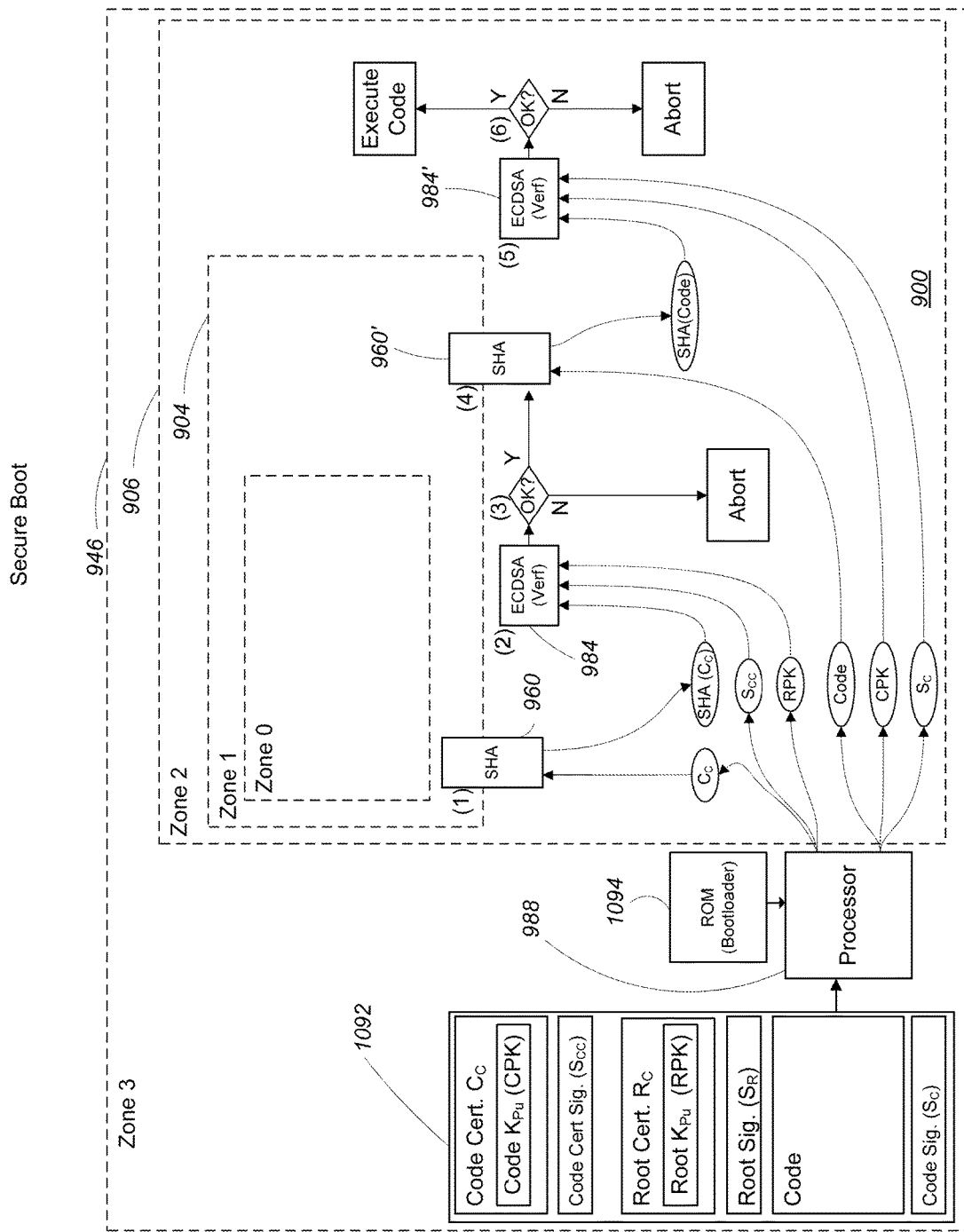
FIG. 10 is a secure boot procedure.

Referring to FIG. 10, a simplified view of the device 900 illustrates the secure boot procedure. In general, the secure boot procedure is a procedure for verifying the authenticity of code (e.g., key management software) before loading the code onto and/or executing the code on a processor (e.g., a Tensilica processor in Zone 3) 988. Generally, a bootloader 1094 verifies that code to be executed on the processor is authentic before execution.

Initially, a code package 1092 is loaded into Zone 3 (e.g., from a persistent external memory source). The code package 1092 includes a code certificate ($C_C$), a code certificate signature ($S_{CC}$), a root certificate ($R_C$), a root signature ($S_R$), the code, and a code signature ($S_C$). The code certificate includes a code public key (CPK) and the root certificate includes a root public key (RPK).

The bootloader 1094 stored, for example, on a ROM, is loaded onto the processor 988 which executes the bootloader to verify the code using the information included in the code package 1092. In a first step (1), the processor 988 provides the code certificate ($C_C$) to the SHA HFG 960 which computes a secure hash of the code certificate (SHA($C_C$)) and stores the secure hash in Zone 2. In a second step (2), the secure hash of the code certificate (SHA($C_C$)), the root public key (RPK), and the code certificate signature ($S_{CC}$) are provided to the ECDSA$_{VERF}$ module 984 which verifies that the code certificate ($C_C$) is trusted.

In a third step (3), if the code certificate ($C_C$) is determined to be un-trusted, the secure boot procedure is aborted. Otherwise, if the code certificate ($C_C$) is determined to be trusted, fourth step (4) is performed in which a secure hash of the code (SHA(Code)) is computed using a second SHG HFG 960'. The secure hash of the code (SHA(Code)) is stored in Zone 2. In a fifth step (5), the secure hash of the code (SHA (Code)), the code public key (CPK), and the code signature ($S_C$) are provided to a second ECDSA$_{Verf}$ module 984' which verifies that the code can be trusted. In a sixth step (6), if the code is determined to be un-trusted, the secure boot procedure is aborted. Otherwise, if the code is determined to be trusted, the code is executed using the processor 988.

2.2.2 Unlock Procedure

Figure 11:
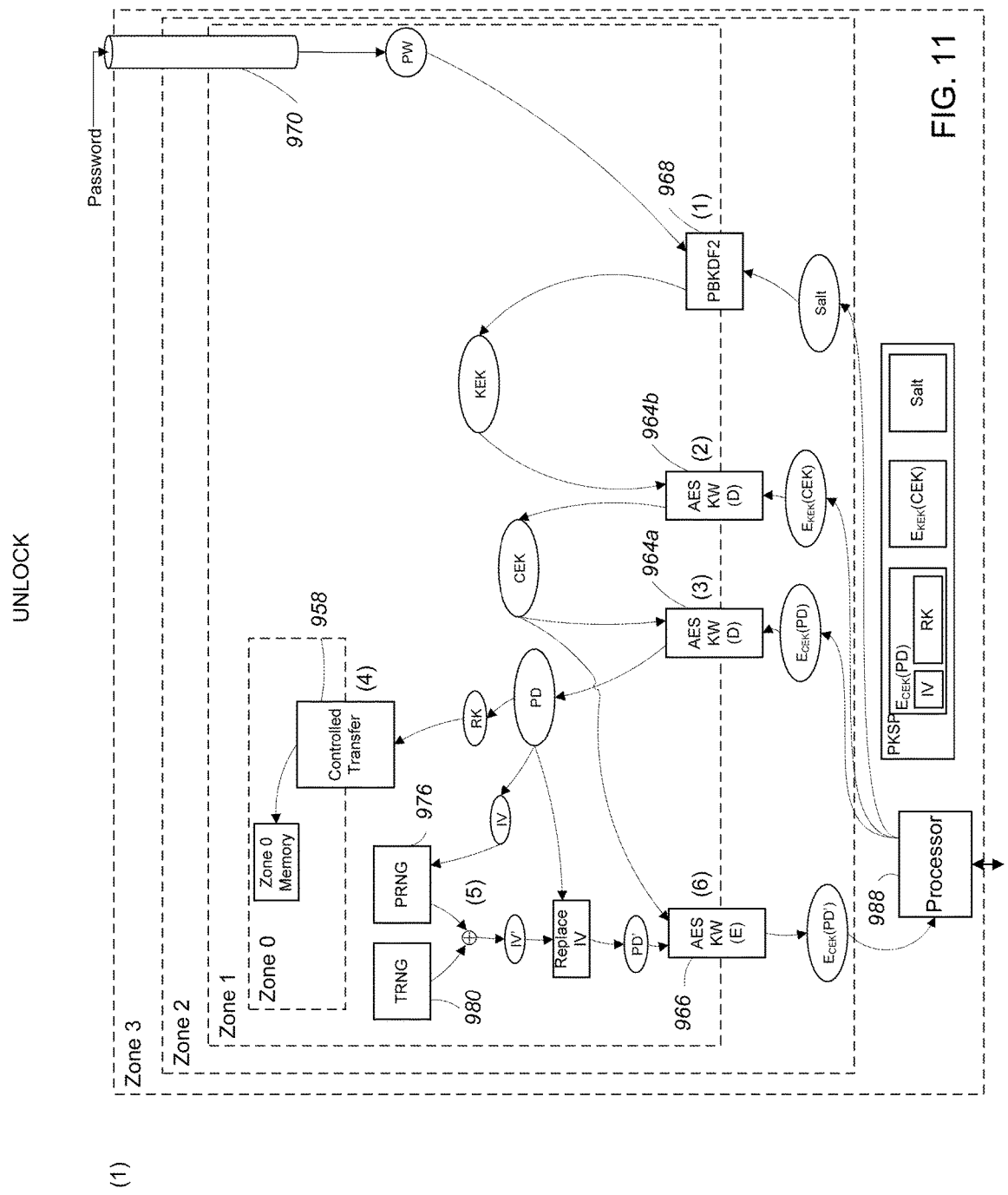
FIG. 11 is an unlock procedure.

Referring to FIG. 11, a simplified view of the device 900 illustrates a procedure for unlocking the device using a user-supplied password. In general, the unlock procedure readies the device for use by loading long-term keys and data into non-volatile memory on the device 900.

Initially, a persistent store key package (PKSP) including encrypted private data ($E_{CEK}$(PD)), an encrypted content encryption key ($E_{KEK}$(CEK)), and a Salt is loaded (e.g., from an external storage device) into Zone 3 by the processor 988. In general, the processor 988 in Zone 3 handles all transfers of data into and out of Zone 2, including transfers of data from the PKSP into Zone 2.

The processor first copies the Salt, the encrypted content encryption key ($E_{KEK}$(CEK)), and the encrypted private data ($E_{CEK}$(PD)) into Zone 2. A high assurance controller (not shown) in the device then waits for a password to be entered through the secure password port 970. When the password (PW) is received, a first step (1) is performed in which the PBKDF2 HFG 968 combines the Salt with the password (PW) to generate a key encryption key (KEK) which it stores in Zone 1.

In a second step (2), the key encryption key (KEK) in Zone 1 and the encrypted content encryption key ($E_{KEK}$(CEK)) in Zone 2 are provided to a first AES keywrap decryptor HFG 964a which decrypts the encrypted content encryption key ($E_{KEK}$(CEK)) using the key encryption key (KEK) and stores the decrypted content encryption key (CEK) in Zone 1.

In a third step (3), the content encryption key (CEK) in Zone 1 and the encrypted private data ($E_{CEK}$(PD)) in Zone 2 are provided to a second AES keywrap decryptor HFG 964b which decrypts the encrypted private data ($E_{CEK}$(PD)) using the content encryption key (CEK) and stores the decrypted private data (PD) in Zone 1.

In some examples, the private data includes root keys (RK) and a seed initialization vector (IV) for use by the pseudo-random number generator (PRNG) 976. In a fourth step (4), the root keys (RK) are provided to the controlled transfer HFG 958 which passes the root keys (RK) into Zone 0 where they are securely stored. In a fifth step (5), the seed initialization vector (IV) is used as a seed for the PRNG 976. The PRNG 976 generates a pseudo-random number which is combined (i.e., XORed) with a true random number generated by the true random number generator (TRNG) 980 to generate an updated seed initialization vector (IV'). The updated seed initialization vector (IV') is used as the initial seed value for the next unlock operation. The initial seed value (IV) in the original private data (PD) is overwritten using the updated initial seed value (IV') resulting in an updated private data (PD').

In a sixth step (6), the updated private data (PD') and the content encryption key (CEK) are provided to the AES encryption HFG 966 which encrypts the updated private data (PD') using the content encryption key (CEK), resulting in an encrypted version of the updated private data ($E_{CEK}$(PD')). The processor 988 stores the encrypted version of the updated private data ($E_{CEK}$(PD')) off of the device for use in the next unlock operation.

2.2.3 Provisioning Procedure

Figure 12:
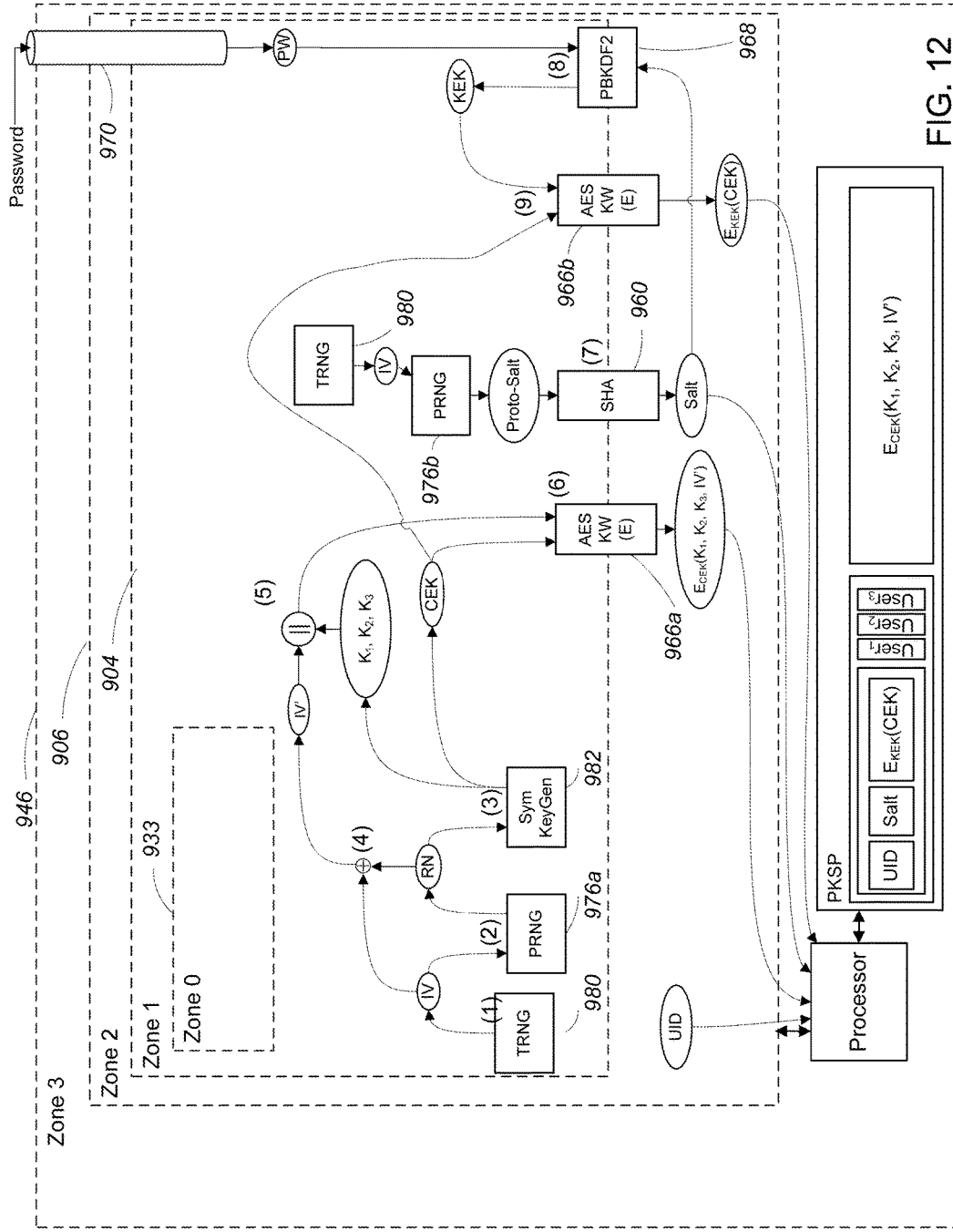
FIG. 12 is a provisioning procedure.

Referring to FIG. 12, a simplified view of the device 900 illustrates a procedure for provisioning the device to generate an updated persistent store key package (PSKP). In general, the provisioning procedure allows for modification of an existing PKSP to, for example, add or remove users from the PKSP. To perform the provisioning procedure, the device must be started and the unlock procedure must have already been performed.

In a first step (1), the true random number generator (TRNG) 980 generates a seed initialization vector (IV) in Zone 1. In a second step (2), the IV is provided to a first pseudo-random number generator (PRNG) 976a in Zone 1 which in turn generates a random number (RN). In a third step (3), the random number (RN) is provided to the symmetric key generation module 982 which generates a content encryption key (CEK) and a number (e.g., 3) of root keys ($K_0$, $K_1$, $K_3$) in Zone 1.

In a fourth step (4), a new initialization vector (IV') is determined in Zone 1 by combining (e.g., XORing) the initialization vector (IV) and the random number (RN). In a fifth step (5), the new initialization vector (IV') and the root keys ($K_0$, $K_1$, $K_3$) are concatenated. In a sixth step (6), the concatenation of the new initialization vector (IV') and the root keys ($K_0$, $K_1$, $K_3$) and the content encryption key (CEK) are provided to a first AES keywrap encryption HFG 966a which encrypts the concatenation of the new initialization vector (IV') and the root keys ($K_0$, $K_1$, ... $K_N$) using the content encryption key (CEK) and stores the encrypted result ($E_{CEK}$($K_0$, $K_1$, $K_3$, IV') in Zone 2.

In a seventh step (7), a second PRNG 976b generates a proto-salt value (Proto-Salt) which is provided to the secure hash function (SHA) HFG 960 which generates a Salt value (Salt) in Zone 2.

In an eighth step (8), the device 900 receives a password (PW) in Zone 1 through the secure password port 970 and provides the password (PW), along with the Salt in Zone 2 to the secure password function (PBKDF2) HFG 968 which generates the key encryption key (KEK) in Zone 1. In a ninth step (9), the content encryption key (CEK) and the key encryption key (KEK) are provided to a second AES encryption HFG 966b which encrypts the content encryption key (CEK) using the key encryption key (KEK) and stores the result ($E_{KEK}$(CEK)) in Zone 2.

Either during the provisioning operation or at the end of the provisioning operation, the processor 988 writes appropriate values, including a user ID (UID), the Salt, the encrypted root keys and initialization vector ($E_{CEK}$($K_0$, $K_1$, $K_3$, IV')), and the encrypted content encryption key (KEK) to the PSKP which is eventually stored off of the device.

2.2.4 Keywrap Generation Procedure

Figure 13:
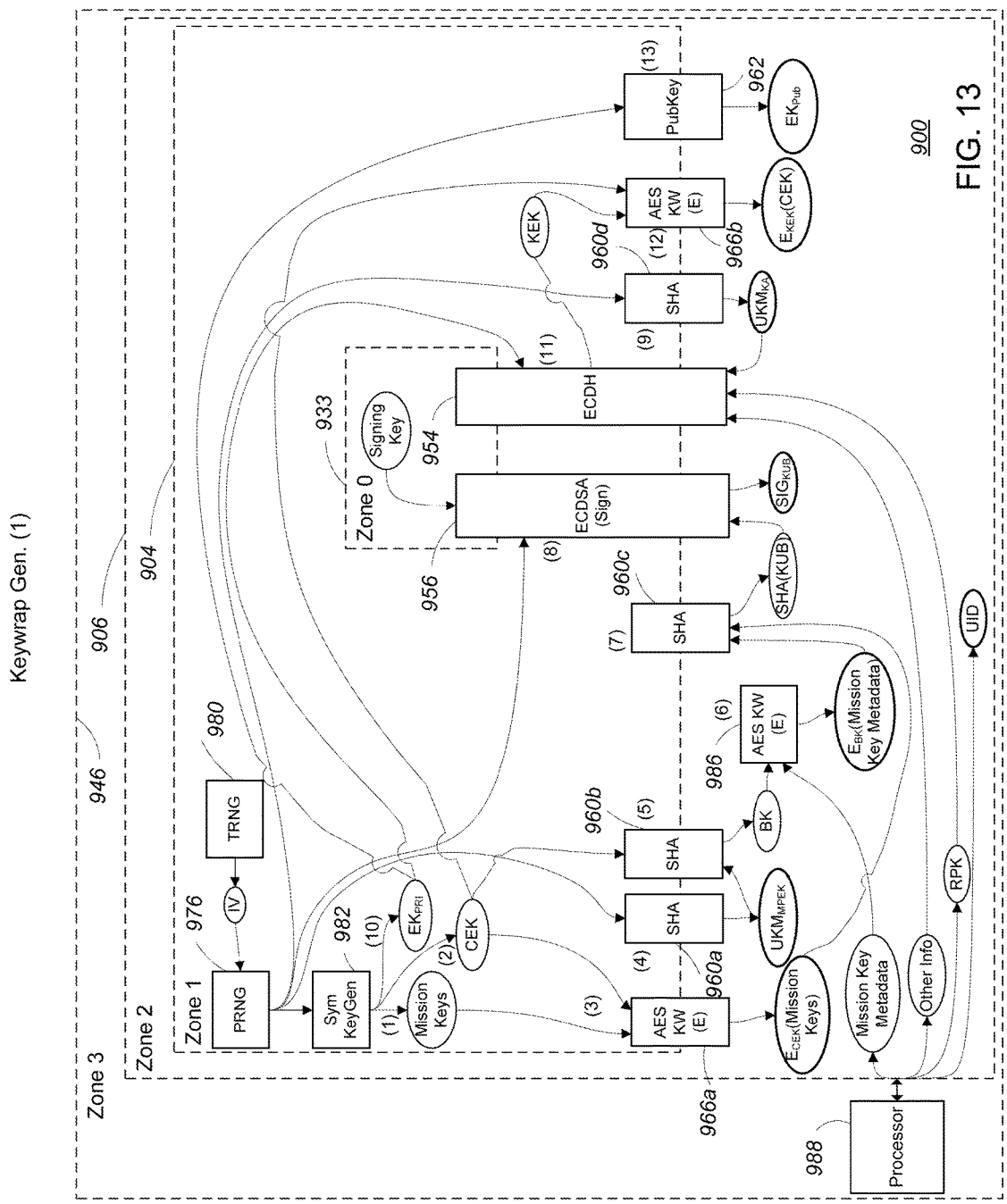
FIG. 13 is a first part of a keywrap generation procedure.
Figure 14:
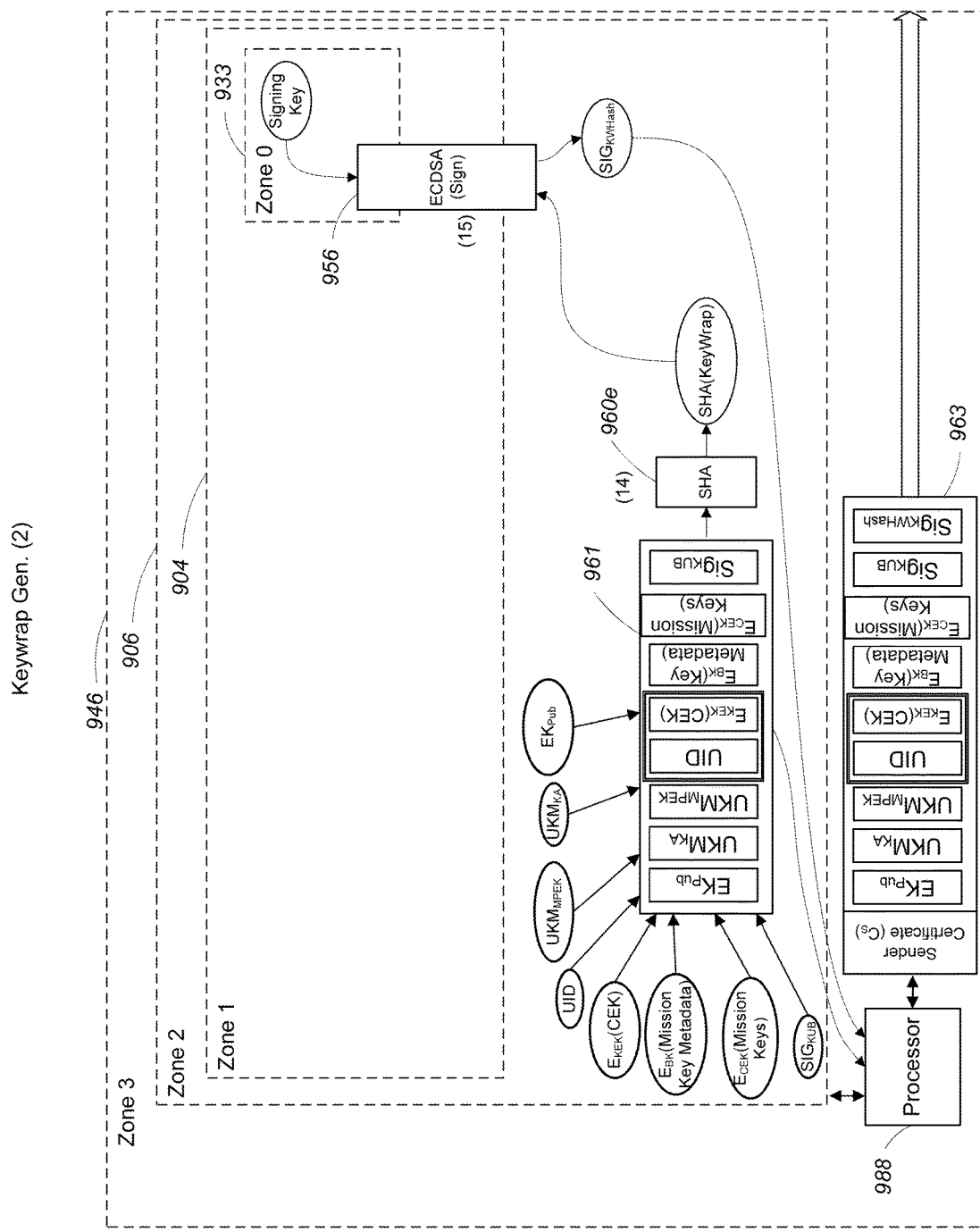
FIG. 14 is a second part of a keywrap generation procedure.

Referring to FIGS. 13 and 14, a simplified view of the device 900 illustrates a procedure for generating a keywrap (e.g., an over-the-air keywrap (OTAK), an over-a-wire keywrap, or a sneaker-net token) for distribution of cryptographic information (e.g., mission or session keys and related metadata) to recipient devices (e.g., sources and sinks of data). In some examples, the keywrap includes a content encryption key (CEK) encrypted for each of the other recipient devices and an encrypted mission key package. To perform the keywrap generation procedure, the device must be initialized, had have at least one root certificate, at least one signing key, and a key agreement key. In some examples, the signing key(s) and the key agreement key(s) are delivered to Zone 0 of the device during the unlock procedure. In some examples, the key agreement key(s) are ephemerally present in Zone 1.

Generally, the keywrap generation procedure, and an associated unwrapping procedure described below, provide a way to combine data from multiple security zones into a single data package in such a way that when a recipient unwraps the data package, the data is redistributed to the appropriate zones without violating the security policy. Therefore, for example, rather than treating keys and their associated metadata as uniform "key data", which would conventionally be encrypted and decrypted together, the keys may be encrypted separated from the metadata for those keys, such that access to the metadata in the keywrap does not necessitate access to the keys.

Referring to FIG. 13, in a first step (1), the pseudo-random number generator (PRNG) 976 generates a random number which is used by the symmetric key generation module 982 to generate one or more mission keys (Mission Keys) in Zone 1. In a second step (2), the PRNG 976 generates another random number which is used by the symmetric key generation module 982 to generate a content encryption key (CEK) in Zone 1. In a third step (3), the mission keys and the content encryption key (CEK) are provided to a first AES keywrap encryption HFG 966a which encrypts the mission keys using the content encryption key (CEK) and stores the result ($E_{CEK}$(Mission Keys)) in Zone 2.

In a fourth step (4), the PRNG 976 generates a random number which is provided to a first secure hash function (SHA) HFG 960a. The SHA HFG 960a computes a secure hash of the random number, resulting in the UKM$_{MPEK}$ nonce which is stored in Zone 2. In a fifth step (5), the UKM$_{MPEK}$ nonce in Zone 2 and the content encryption key (CEK) in Zone 1 are provided to a second SHA HFG 960b which applies a secure hash function to the two values to compute a "black key" (BK) which it stores in Zone 2. It is noted that using a secure hash function is one of many possible ways to derive the black key.

In a sixth step (6), mission key metadata, which is provided to Zone 2 by the processor 988, and the black key (BK) are provided to an AES keywrap encryption module 986 which encrypts the mission key metadata using the black key (BK) and stores the result ($E_{BK}$(Mission Key Metadata)) in Zone 2. In a seventh step (7), The encrypted mission key metadata (EBK(Mission Key Metadata)) and the encrypted mission keys (ECEK(Mission Keys)) are provided to a third SHA HFG 960c. The third SHA HFG 960c computes a secure hash of the key update block (KUB) including the encrypted mission key metadata (EBK(Mission Key Metadata)) and the encrypted mission keys (ECEK (Mission Keys)), resulting in a key update block hash (SHA(KUB)) in Zone 2.

In an eighth step (8), the key update block hash (SHA (KUB)) in Zone 2, a random value generated by the PRNG 976 in Zone 1, and a signing key in Zone 0 are provided to the elliptic curve digital signing algorithm ($ECDSA_{sign}$) HFG 956. The $ECDSA_{sign}$ HFG 956 creates a signature ($SIG_{KUB}$) for the KUB which it stores in Zone 2.

In a ninth step (9), another random value generated by the PRNG 976 is provided to a fourth SHA HFG 960d. The fourth SHA HFG 960d applies a secure hash function to the random number to generate a $UKM_{KA}$ nonce in Zone 2. In a tenth step (10), another random number generated by the PRNG 976 is provided to the symmetric key generator 982 which generates an ephemeral private key ($EK_{Pri}$) in Zone 1. In an eleventh step (11), the ephemeral private key ($EK_{Pri}$), the UKMKA nonce, "other info" provided by the processor, and a recipient's public key (RPK) are provided to the elliptic key diffie-hellman (ECDH) HFG 954 which generates a key encryption key (KEK) in Zone 1 from its inputs.

In a twelfth step (12), the key encryption key (KEK) and the content encryption key (CEK) are provided to a second AES keywrap encryption HFG 966b. The second AES keywrap encryption HFG 966b encrypts the content encryption key (CEK) using the key encryption key (KEK) resulting in an encrypted content encryption key ($E_{KEK}$(CEK)) in Zone 2. A unique ID (UID) provided by the processor 988 is associated with the encrypted content encryption key ($E_{KEK}$(CEK)). In some examples, multiple (e.g., 32) UID/$E_{KEK}$(CEK) pairs are generated for multiple recipients.

In a thirteenth step (13), another random number generated by the PRNG 976 is provided to the public key generation HFG 962 which generates an ephemeral public key ($EK_{Pub}$) in Zone 2.

Referring to FIG. 14, a continuation of the keywrap generation procedure is illustrated. Note that the bolded items (i.e., the bolded oval shapes) in FIG. 13 are reproduced in FIG. 14.

In a fourteenth step (14), the ephemeral public key ($EK_{Pub}$), the UKMKA nonce, the UKMMPEK nonce, the user identification(s) (UID), the encrypted content encryption key(s) (EKEK(CEK)), the encrypted mission key metadata (EBK(Mission Key Metadata)), the encrypted mission keys (ECEK(Mission Keys)), and the KUB signature ($SIG_{KUB}$) are bundled into a keywrap 961 in Zone 2. The keywrap 961 is provided to a fifth SHA HFG 960e which computes a secure hash of the keywrap (SHA(KeyWrap)) in Zone 2.

In a fifteenth step (15), the secure hash of the keywrap (SHA(KeyWrap)) and the signing key in Zone 0 are provided to the ECDSA signing module 956 which computes a signature of the secure hash of the keywrap ($SIG_{KWHash}$).

The keywrap 961 and the signature of the secure hash of the keywrap ($SIG_{KWHash}$) are provided to the processor 988 which appends a sender's certificate ($C_S$) 963 to the keywrap 961 and the signature of the secure hash of the keywrap ($SIG_{KWHash}$) before transmitting the keywrap from the device 900.

Note that as described above, the mission keys are encrypted by a content encryption key (step 3), both of which are restricted to Zone 1, while the metadata is encrypted by a secure hash of the content encryption key (referred to as the "black key" above) according to steps (5) and (6). Therefore, only the secure hash of the content encryption key is needed in Zone 2 to decrypt the metadata, thereby maintaining the Zone 1 security of the mission keys in the keywrap.

In some examples, certain items in the keywrap are collectively referred to as a "header." In some examples, the header includes information necessary to decrypt the content encryption key. In some examples, the header includes a key agreement key, a password, a symmetric key, and so on.

2.2.5 Keywrap Unwrap Procedure

Figure 15:
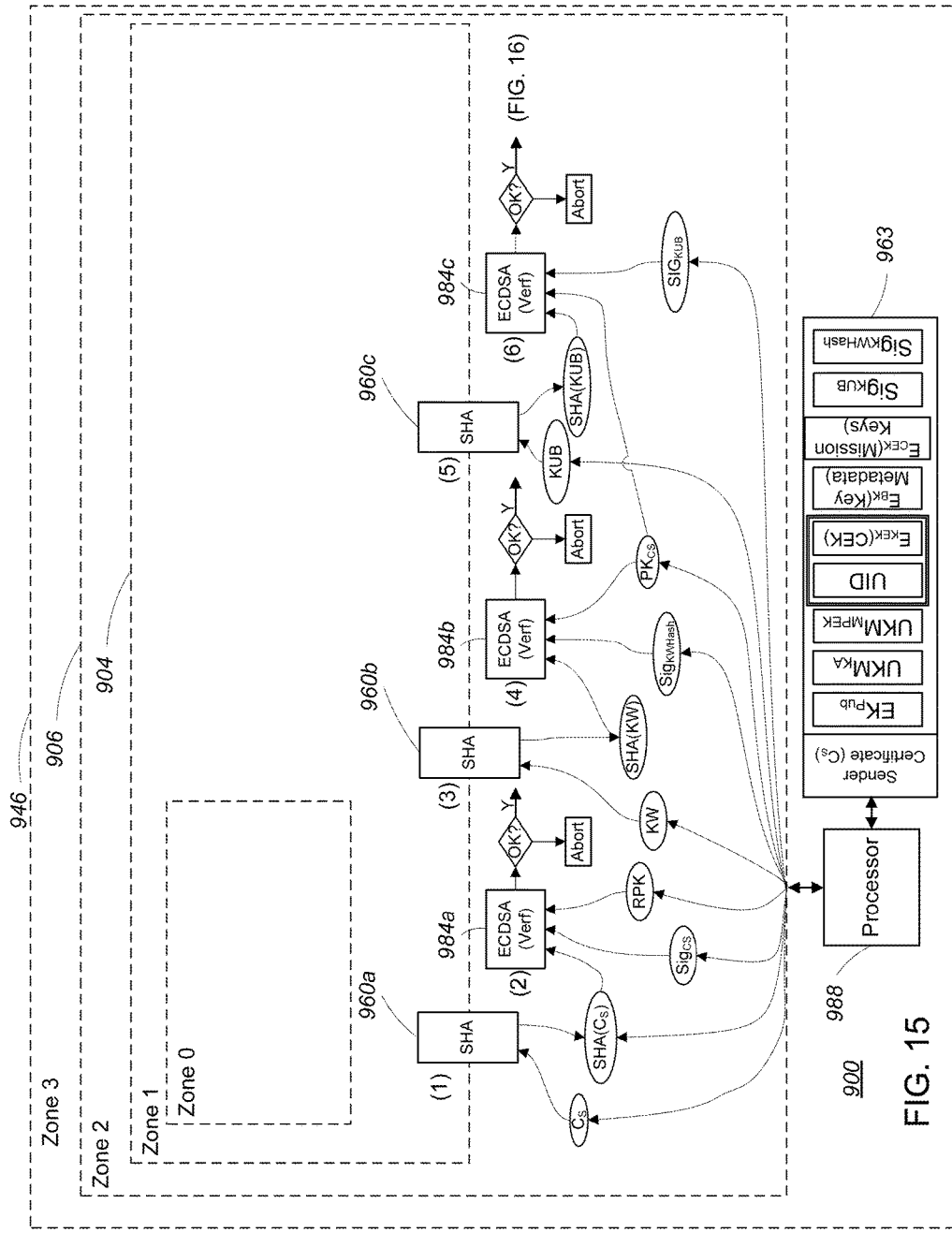
FIG. 15 is a first part of a key unwrap procedure.
Figure 16:
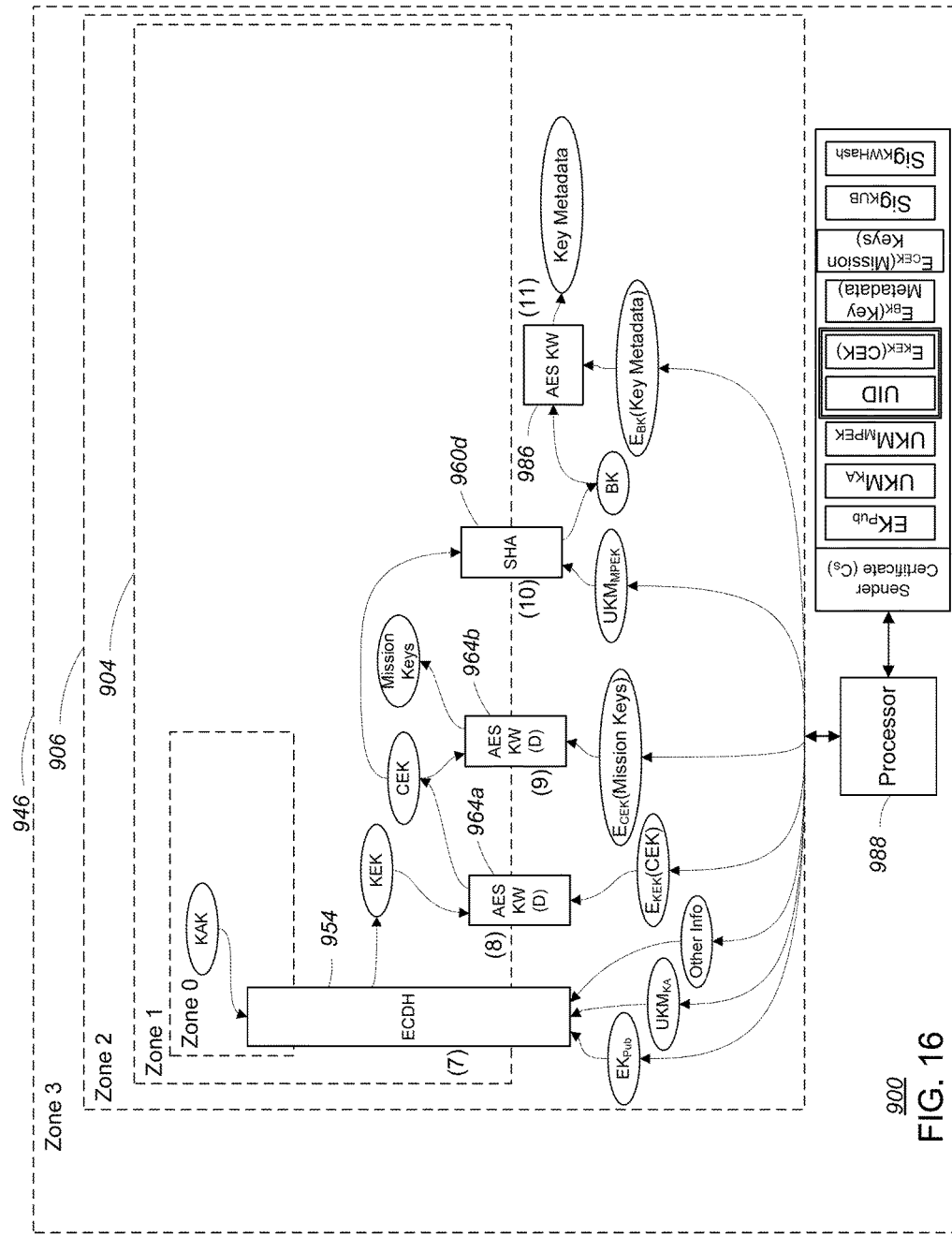
FIG. 16 is a second part of a key unwrap procedure.

Referring to FIGS. 15 and 16 a simplified view of the device 900 illustrates a procedure for unwrapping a keywrap (e.g., the keywrap generated in FIGS. 14 and 15) to access the cryptographic information contained therein. In general, the keywrap unwrap procedure occurs at a recipient device which receives a keywrap from a sender device and stores the keywrap in its Zone 3. Unless otherwise noted, data from the keywrap is read from Zone 3 into Zone 2 via the processor 988 as needed.

In a first step (1), the sender's certificate ($C_S$) is provided to a first secure hash function (SHA) HFG 960a which computes a secure hash of the sender's certificate (SHA($C_S$)) and stores it in Zone 2. In a second step (2), the validity of the sender's certificate ($C_S$) is verified by providing the secure hash of the sender's certificate (SHA($C_S$)), the signature of the sender's certificate ($SIG_{CS}$), and the root public key (RPK) associated with the sender's certificate to a first elliptic key digital signature verification module ($ECDSA_{Verf}$) 984a. If the first $ECDSA_{Verf}$ module 948a indicates that the sender's certificate is invalid, then the key unwrap procedure is aborted. Otherwise, the key unwrap procedure continues.

In a third step (3), the keywrap (KW) 963 is provided to a second secure hash function (SHA) HFG 960b which computes a secure hash of the keywrap (SHA(KW)) and stores it in Zone 2. In a fourth step (4), the validity of the keywrap hash signature ($Sig_{KWHash}$) is verified by providing the secure hash of the keywrap (SHA(KW)), the keywrap hash signature ($Sig_{KWHash}$) 5 and the public key of the sender's certificate ($PK_{CS}$) to a second $ECDSA_{Verf}$ module 984b. If the second $ECDSA_{Verf}$ module 948b indicates that the keywrap signature ($Sig_{KWHash}$) is invalid, then the key unwrap procedure is aborted. Otherwise, the key unwrap procedure continues.

In a fifth step (5), the key update block (KUB) including the encrypted mission keys ($E_{CEK}$(Mission Keys)) and the encrypted mission key metadata ($E_{BK}$(Key Metadata)) is provided to a third secure hash function (SHA) HFG 960c which computes a secure hash of the key update block (SHA(KUB)) and stores it in Zone 2. In a sixth step (6), the validity of the key update block signature ($Sig_{KUB}$) is verified by providing the secure hash of the key update block (SHA(KUB)), the key update block signature ($Sig_{KUB}$), and the public key of the sender's certificate ($PK_{CS}$) to a third $ECDSA_{Verf}$ module 984c. If the third $ECDSA_{Verf}$ module 948c indicates that the key update block signature ($Sig_{KUB}$) is invalid, then the key unwrap procedure is aborted. Otherwise, the key unwrap procedure continues.

Referring to FIG. 16, a continuation of the key unwrap procedure is illustrated. In a seventh step (7), the key agreement key (KAK) in Zone 0, the ephemeral public key ($EK_{Pub}$) in Zone 2, the $UKM_{KA}$ nonce in Zone 2, and the "other info" in Zone 2 are provided to the elliptic key Diffie-Hellman key generation (ECDH) HFG 954 which uses its inputs to generate a key encryption key (KEK) in Zone 1.

In a eighth step (8), the encrypted content encryption key ($E_{KEK}$(CEK)) (matching the UID of the device) in Zone 2 and the key encryption key (KEK) in Zone 1 are provided to a first AES keywrap decryption HFG 964a which decrypts the encrypted content encryption key ($E_{KEK}$(CEK)) using the key encryption key (KEK) resulting in a decrypted content encryption key (CEK) in Zone 1. In an ninth step (9), the encrypted mission keys ($E_{CEK}$(Mission Keys)) in Zone 2 and the content encryption key (CEK) in Zone 1 are provided to a second AES keywrap decryption HFG 964b which decrypts the encrypted mission keys ($E_{CEK}$(Mission Keys)) using the content encryption key (CEK) resulting in decrypted mission keys (Mission Keys) being stored in Zone 1.

In a tenth step (10), the content encryption key (CEK) in Zone 1 and the $UKM_{MPEK}$ nonce in Zone 2 are provided to a fourth SHA HFG 960d which computes a secure hash of the content encryption key (CEK) and the $UKM_{MPEK}$ nonce resulting in a black key (BK) in Zone 2. In an eleventh step (11), the black key (BK) and the encrypted key metadata ($E_{BK}$(Key Metadata)) are provided to an AES keywrap decryption module 986 which decrypts the encrypted key metadata ($E_{BK}$(Key Metadata)) using the black key (KB) resulting in decrypted key metadata (Key Metadata) in Zone 2.

In some examples the key metadata is used by the processor 988 to determine how the mission keys are organized in the Zone 1 memory.

Note that exchanging keywraps between devices enables establishing shared secrets (e.g., keys) and mutual authentication between corresponding zones in the devices, thereby logically extending a zone of one device with that corresponding zone of the other device.

3 Verification

In general, the circuitry of the hardware functional gates and the circuitry of the security zones are specified in software using, for example, a hardware description language. The software specification is used to automatically lay the circuitry out on a device such as an FPGA. Advantageously, verification of the security properties of the hardware functional gates and the security zones can be carried out entirely by static analysis of the software specification of the device without requiring any inspection of the laid out design.

For example a human or a static analysis computer program can analyze the software specification of the device to ensure that the circuitry related to data paths of the different security zones is mutually exclusive. That is, the circuitry related to data paths of a given security zone is not connected to the circuitry related to data paths of another different security zone except via rigorously verified gate circuitry. Similarly, a human or static analysis computer program can analyze the software specification of the device to ensure that the hardware functional gate circuits abide by their respective security policies (i.e., the hardware functional gate circuits do not allow for leakage of data between zones).

4 Applications

Figure 17:
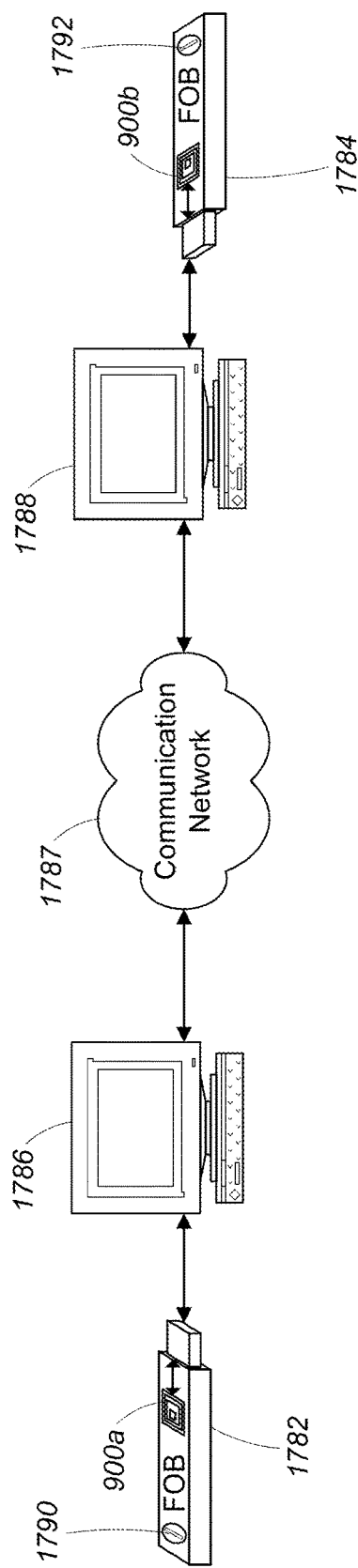
FIG. 17 is a key fob application of a key management and cryptography device.

The key management and cryptography device 900 described above can be used in a wide variety of applications, for example, where secure communication or identity management is required. Referring to FIG. 17, one example of an application utilizing the key management and cryptography device 900 includes a pair of key fobs (e.g., USB key fobs) 1782, 1784 which can be used to establish a secure network communication session between two computers 1786, 1788 over a communication network (e.g., the internet) 1787. Each of the key fobs includes an instance of the key management and cryptography device 900a, 900b.

In general, in operation, each of the key fobs 1782, 1784 is first plugged into its respective computer 1786, 1788. Respective users (not shown) associated with the key fobs 1782, 1784 unlock the key fobs by entering passwords which are transmitted to the key management and cryptography devices 900a, 900b of the key fobs. In some examples, the users can enter their passwords by swiping their fingers over fingerprint readers 1790, 1792. In other examples, the users can enter their passwords by typing their passwords using keyboards connected to the computers 1786, 1788. Once unlocked, the key management and cryptography devices 900a, 900b can exchange cryptographic information via keywraps (as described above) to establish shared keys (e.g., shared keys in respective zone 1's) for secure communication channel between the two computers. All secure information passed between the two computers is then encrypted/decrypted by the key management and cryptography devices 900a, 900b using the cryptographic keys managed by the devices 900a, 900b.

Figure 18:
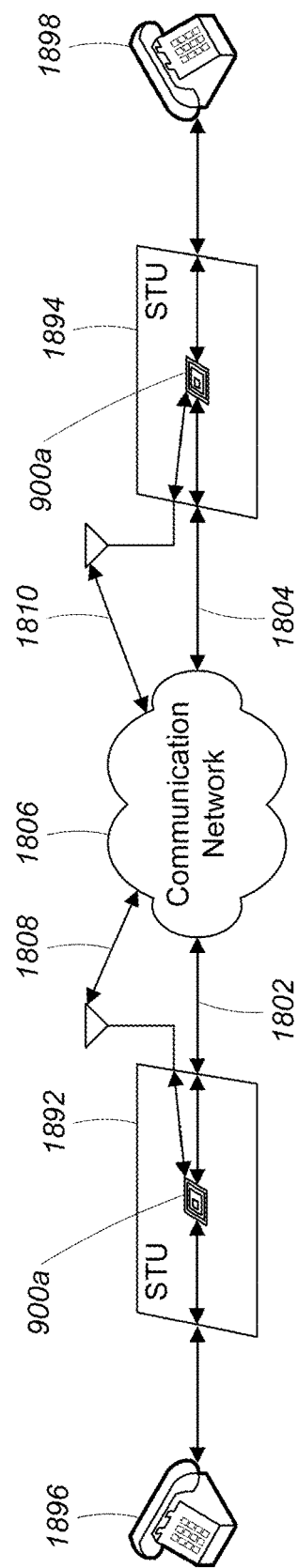
FIG. 18 is a secure telephony application of a key management and cryptography device.

Referring to FIG. 18, another example of an application utilizing the key management and cryptography device 900 includes two secure telephone units 1892, 1894, each connected to a respective telephone handset 1896, 1898. The secure telephone units 1892, 1894 are each connected to a communication network 1806 via, for example, a wireless connection 1808, 1810, or a wired connection 1802, 1804. Each of the secure telephone units 1892, 1894 includes an instance of the key management and cryptography device 900a, 900b which together establish a secure communication channel between the two secure telephone units 1892, 1894.

In general, respective users (not shown) associated with the secure telephone units 1892, 1894 can unlock the secure telephone units by entering a password which is transmitted to the key management and cryptography devices 900a, 900b in the secure telephone units. In some examples, the users can enter their password by typing it into their handset. Once unlocked, the key management and cryptography devices 900a, 900b exchange cryptographic information via keywraps (as described above) to establish mutual authentication and shared keys for secure communication channel between the secure telephone units. All secure information passed between the two secure telephone units is then encrypted/decrypted by the key management and cryptography devices 900a, 900b using the cryptographic keys managed by the devices 900a, 900b.

Figure 19:
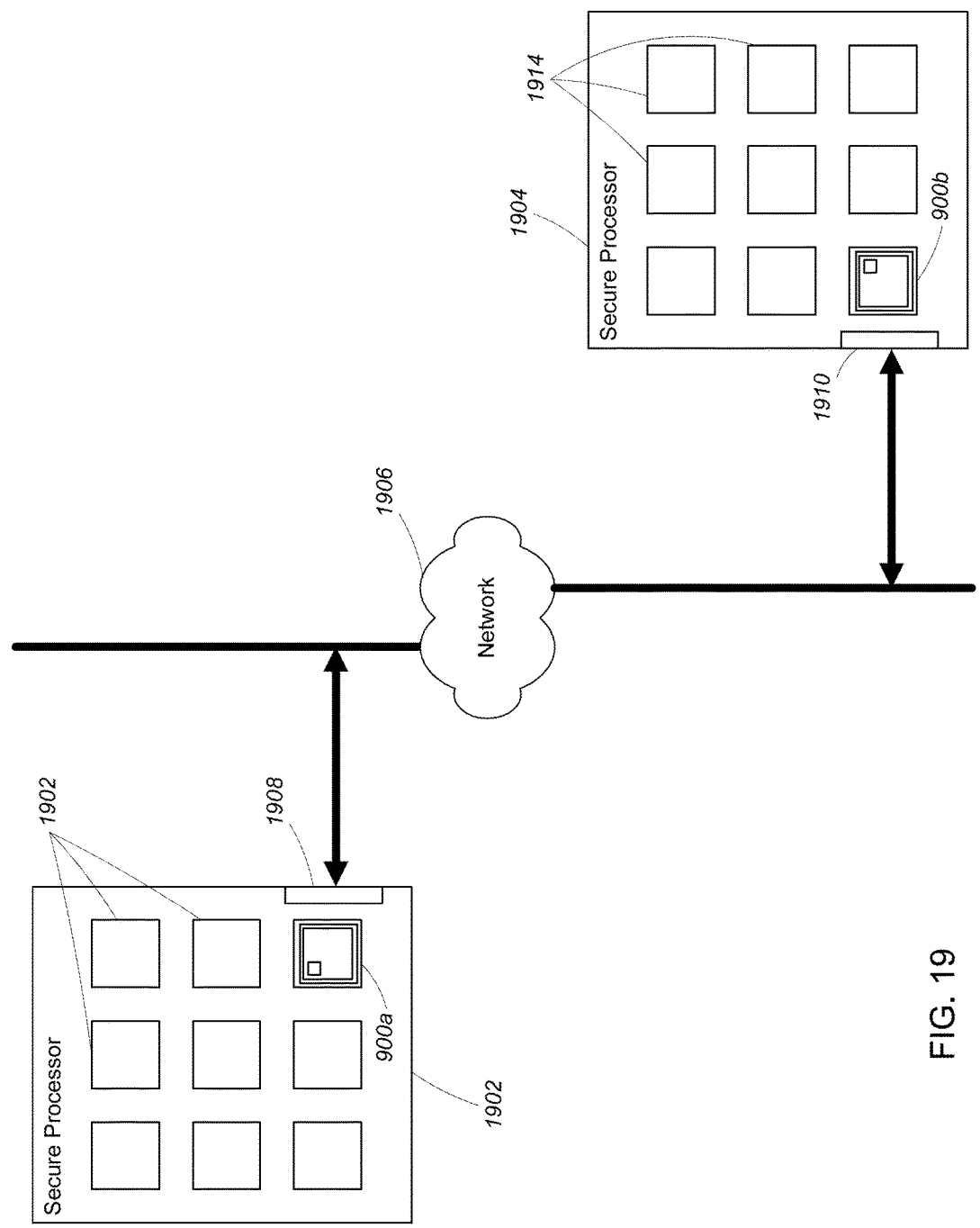
FIG. 19 is a secure processing application of a key management and cryptography device.

Referring to FIG. 19, another example of an application utilizing the key management and cryptography device 900 includes two secure processors 1902, 1904 each connected to a network 1906 (e.g., a local area network (LAN)) through a network interface 1908, 1910. The secure processors 1902, 1904 wish to securely communicate with one another over the network. Each of the secure processors 1902, 1904 includes a number of general purpose processors 1912, 1914 and a key management and cryptography device 900a, 900b. In this example, the each of the key management and cryptography devices 900a, 900b includes a password read only memory (ROM) (not shown) which stores its respective password for unlocking purposes. When the secure processors boot, their respective key management and cryptography devices unlock themselves by reading the password from their respective password ROMs. Once unlocked, the key management and cryptography devices 900a, 900b can exchange cryptographic information via keywraps (as described above) to establish a secure communication channel between the secure processors. All secure information passed between the two secure processors must be encrypted/decrypted by the key management and cryptography devices 900a, 900b using the keys managed by the devices 900a, 900b.

Referring to FIG. 20, another example of an application using the key management and cryptography device includes a number of unmanned aerial vehicles (UAVs) 2000 and a number of ground based stations 2006 (e.g., handheld computers, laptops, and so on), each having an on-board key management and cryptography device 900 (not shown), and a centralized control station 2002 in communication (e.g., radio communication) with the UAVs. The control station 2002 creates keywraps 2004 and distributes the keywraps to the UAVs and the ground based stations.

In some examples, the keywraps enable the UAVs and the ground based stations to communicate securely with the control station and with each other. In some examples, the keywraps authorize or prohibit certain ground based stations access to a downlink 2008 from one or more of the UAVs. In some examples, the downlink 2008 includes video data or other sensor data which is consumed by authorized ground based stations. In some examples, the keywraps authorize or prohibit certain ground based stations' access to weapons systems on the UAVs.

In some examples, the control station directly provides keywraps to both the UAVs and the ground based stations. In other examples, keywraps are provided to the UAVs which relay the keywraps to the ground based stations.

In some examples, the control station 2002 distributes cryptographic keys to the group of UAVs to secure the group's communication (e.g., secure multicast). In some examples, the control station 2002 distributes cryptographic keys on-the-fly to authorized devices (e.g., aerial vehicles and ground terminals).

In some examples, multiple control stations are present and the key management and cryptography devices are used to facilitate communication hand-off between the control stations. In some examples, the key management and cryptography devices are used to establish relays among multiple UAVs (e.g., to communicate over long distances).

In other examples, the key management and cryptography device can be used to establish secure vehicular networks, secure sensory networks, secure utility sensor networks, secure industrial automation, and end-to-end protected data storage in a cloud.

In some examples, the control station is a secure key server which generates keywraps but does not necessarily include the key management and cryptography device.

In some examples, the system described above can be used to establish secure communication channels between other unmanned systems such as drones (e.g., remotely piloted aircraft, unmanned aircraft systems, and so on).

5 Alternatives

In some examples, HFGs read inputs from a first zone and place outputs in a second, different zone. In other examples, HFGs read inputs from a first zone and place outputs in the first zone (i.e., the same zone).

In some examples, the security architecture is manifested as hardware having physical separations and explicit interconnections. This eliminates the reliance on logical controls and logical guards.

In some examples, the architecture of the device is optimized after design and verification of the device is complete. Optimization may include consolidation of replicated functions and/or addition of additional security measures such as multiplexing of signals and data in a controlled manner to meet security requirements. For example, a single keygen function that takes as input a destination zone could be used to replace multiple, zone-specific keygen functions.

In the examples described above, all encryption and decryption operations are described as using AES encryption and decryption algorithms and Elliptic Curve Cryptography (ECC). However, it is noted that the device is not limited to using AES and ECC cryptography algorithms and is capable of using any suitable cryptography algorithms.

In some examples, the design of the key management and cryptography device is optimized to reduce complexity, merge security zones, or other optimizations without compromising the security of the device.

In some examples, the key management and cryptography device is used both as a producer and consumer of keywraps. In other examples, keywraps are produced by a secure device which does not necessarily include the key management and cryptography device. For example, a key management server may provide keywraps to clients to facilitate access to data (e.g., retrieved from a cloud service). In another example, a key server which does not necessarily include the key management and cryptography device can distribute group keys using an advanced tree-based keying scheme in a scalable group keying scheme.

In some examples, other types of hardware functional gates exist. For example, a hardware functional gate with internal storage wherein the internal storage bridges two security zones.

While in the examples above, a secure hash function is used to, for example, create keys in Zone 2, it is noted that other types of non-invertible, one way functions can be used in place of the secure hash function.

6 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

In some implementations, a circuit conforming to the approaches described above is specified as stored configuration data on a non-volatile computer-readable medium for a configurable device that imparts functionality onto a device, for instance, as "personality data" for a Field Programmable Gate Array. In some examples, the HFG are provided as a library of selectable configuration data that is used to assemble an overall device using conventional configuration tools. In some examples, the circuitry is specified in a Hardware Description Language (HDL), for instance Verilog statements and instructions stored on a non-volatile computer-readable medium, such that a circuit conforming to the security architecture can be made according to the specification, for example, using automated layout and fabrication techniques. In some examples, the HFG are provided as a library of modules, which may be incorporated into an overall circuit design, such that the security of the overall design may be verified (e.g., by automated tools).

It is to be understood that the foregoing description is intended to illustrate and not to limit the scope of the invention, which is defined by the scope of the appended claims. Other embodiments are within the scope of the following claims.

What is claimed is:

1. A method for computer-implemented verification of security of a device comprising:
   accepting data comprising a circuit description of the device;
   identifying using a computer a plurality of mutually independent circuit zones from the circuit description such that no data paths pass directly between said circuit zones;
   identifying a plurality of gate circuits providing data paths linking the circuit zones, the gate circuits being verified to limit unmodified transfer of data between zones by their circuitry according to a security policy; and
   verifying that the device complies with the security policy according to whether all data paths between the circuit zones are via the identified gate circuits according to the security policy.

2. The method of claim 1 further comprising using a computer to verify that the gate circuits limit unmodified transfer of data between zones by their circuitry according to the security policy.

3. The method of claim 1 wherein accepting the circuit description of the device includes accepting a specification of the circuit zones of the device.

4. The method of claim 1 further comprising associating a security index with each circuit zone, and wherein verifying that the device complies with the security policy comprises verifying that the indices of interfaces between the gate circuits and the circuit zones satisfy the security policy.

5. The method of claim 1 wherein verifying that the device complies with the security policy includes performing a static analysis of the circuit description of the device.

6. The method of claim 1 wherein verifying that the device complies with the security policy includes determining that the plurality of gate circuits abide by the security policy.

7. The method of claim 1 wherein verifying that the device complies with the security policy includes determining that the circuitry associated with each circuit zone of plurality of mutually independent circuit zones is mutually exclusive from the circuitry associated with all other circuit zones of the plurality of mutually independent circuit zones.

8. A non-transitory machine-readable medium comprising instructions stored thereon, where the instructions when executed by a data processing system to verify security of a device, the verifying comprising:
   accepting data comprising a circuit description of the device;
   identifying using a computer a plurality of mutually independent circuit zones from the circuit description such that no data paths pass directly between said circuit zones;
   identifying a plurality of gate circuits providing data paths linking the circuit zones, the gate circuits being verified to limit unmodified transfer of data between zones by their circuitry according to a security policy; and
   verifying that the device complies with the security policy according to whether all data paths between the circuit zones are via the identified gate circuits according to the security policy.

9. The non-transitory machine-readable medium of claim 8 wherein the verifying further comprises using a computer to verify that the gate circuits limit unmodified transfer of data between zones by their circuitry according to the security policy.

10. The non-transitory machine-readable medium of claim 8 wherein accepting the circuit description of the device includes accepting a specification of the circuit zones of the device.

11. The non-transitory machine-readable medium of claim 8 wherein the verifying further comprises associating a security index with each circuit zone, and wherein verifying that the device complies with the security policy comprises verifying that the security indices of interfaces between the gate circuits and the circuit zones satisfy the security policy.

12. The non-transitory machine-readable medium of claim 8 wherein verifying that the device complies with the security policy includes performing a static analysis of the circuit description of the device.

13. The non-transitory machine-readable medium of claim 8 wherein verifying that the device complies with the security policy includes determining that the plurality of gate circuits abide by the security policy.

14. The non-transitory machine-readable medium of claim 8 wherein verifying that the device complies with the security policy includes determining that the circuitry associated with each circuit zone of plurality of mutually independent circuit zones is mutually exclusive from the circuitry associated with all other circuit zones of the plurality of mutually independent circuit zones.

* * * * *